(12) United States Patent
Suzuki et al.

(10) Patent No.: US 7,986,068 B2
(45) Date of Patent: Jul. 26, 2011

(54) MOTOR

(75) Inventors: Takanori Suzuki, Utsunomiya (JP); Tatsuya Fukushima, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 213 days.

(21) Appl. No.: 12/486,221

(22) Filed: Jun. 17, 2009

(65) Prior Publication Data
US 2009/0315423 A1    Dec. 24, 2009

(30) Foreign Application Priority Data

Jun. 18, 2008  (JP) .................................. 2008-159221
Jun. 18, 2008  (JP) .................................. 2008-159557
Jun. 19, 2008  (JP) .................................. 2008-160125

(51) Int. Cl.
    *H02K 15/02*    (2006.01)
(52) U.S. Cl. .............................. 310/156.22; 310/156.61
(58) Field of Classification Search ............. 310/156.01, 310/156.03, 156.22, 156.27, 156.53, 156.56, 310/156.61, 156.79
See application file for complete search history.

(56) References Cited

U.S. PATENT DOCUMENTS

| | | | | |
|---|---|---|---|---|
| 1,467,938 A | * | 9/1923 | Janette .......................... 403/252 |
| 2,060,259 A | * | 11/1936 | Spengler .................. 310/156.61 |
| 2,421,115 A | * | 5/1947 | Carlson .......................... 29/598 |
| 2,927,229 A | * | 3/1960 | Merrill .......................... 310/162 |
| 4,697,114 A | * | 9/1987 | Amemiya et al. ....... 310/156.61 |
| 5,111,094 A | * | 5/1992 | Patel et al. .............. 310/156.22 |
| 5,704,111 A | * | 1/1998 | Johnson et al. ................ 29/598 |
| 6,927,526 B2 | * | 8/2005 | Ishii et al. ................. 310/261.1 |
| 7,659,645 B2 | * | 2/2010 | Bi .................................. 310/51 |
| 7,812,485 B2 | * | 10/2010 | Bi et al. ......................... 310/51 |

FOREIGN PATENT DOCUMENTS

| | | |
|---|---|---|
| JP | 5-199687 | 8/1993 |
| JP | 2002-78291 | 3/2002 |
| JP | 2003-134705 | 5/2003 |

* cited by examiner

*Primary Examiner* — Dang D Le
(74) *Attorney, Agent, or Firm* — Nelson Mullins Riley & Scarborough LLP; Anthony A. Laurentano

(57) ABSTRACT

A motor including: a rotatably supported shaft; and a rotor section press-fitted and fixed coaxially to the shaft, wherein the rotor section is provided with: a rotor yoke; a housing hole formed on an end surface of the rotor yoke along the axial direction of the shaft; a permanent magnet housed within the housing hole; and a pair of end surface plates: that have a ring-shaped plate that is provided so as to cover at least an opening section of the housing hole and that is made of a non-magnetic material, and a supporting plate that supports the ring-shaped plate, that is press-fitted and fixed on the shaft, and that has a coefficient of linear expansion equivalent to that of the shaft; that are provided on axial end portions of the rotor yoke; and that clamp the rotor yoke so as to hold the permanent magnet within the housing hole.

17 Claims, 22 Drawing Sheets

MOTOR

BACKGROUND OF THE INVENTION

Priority is claimed on Japanese Patent Application No. 2008-159221, filed Jun. 18, 2008, Japanese Patent Application No. 2008-159557, filed Jun. 18, 2008, and Japanese Patent Application No. 2008-160125, filed Jun. 19, 2008, the contents of which are incorporated herein by reference.

FIELD OF THE INVENTION

The present invention relates to a motor.

DESCRIPTION OF THE RELATED ART

Heretofore, there has been known a motor that is provided with a cylinder-shaped stator, a rotor section that is arranged on the inner side of the stator, and a shaft that is press-fitted and fixed coaxially to the rotor and that is rotatably supported. Motors are widely used as a power source in various areas such as home electric appliance products, and are also used in recent years as a power source for vehicles such as hybrid vehicles and fuel cell vehicles.

The rotor section of the motor mentioned above is provided with: a rotor yoke with a plurality of magnetic plate materials laminated therein; a permanent magnet that is housed within a housing hole formed along the axial direction from the end surface of the rotor yoke; and an end surface plate that is provided on the axial end portion of the rotor yoke and that retains the permanent magnet. The end surface plate is provided so as to cover the end surface along the axial direction of the rotor yoke, in order to prevent the permanent magnet from becoming detached and falling out from the opening section.

For example, as disclosed in Japanese Unexamined Patent Application, First Publication No. 2003-134705 (Patent Document 1), there has been known a technique in which an end surface plate is configured with a non-magnetic material to thereby prevent short-circuiting of the magnetic flux produced from a permanent magnet.

Also, Japanese Unexamined Patent Application, First Publication No. H5-199687 discloses a technique related to fixation of a rotor section and a shaft, and Japanese Patent, Publication No. 3749098 discloses a technique related to cooling performance of a rotary electric machine.

Incidentally, a problem with the end surface plate according to the above Patent Document 1 is how to fasten the end surface plate and the shaft.

Specifically, in a case where the end surface plate is entirely formed with non-magnetic material (for example, stainless steel), the difference in coefficient of linear expansion between the end surface plate and the shaft (for example, iron) becomes significant. Therefore, in a case where the motor becomes a high temperature when driving the motor, a clearance occurs between the end surface plate and the shaft, with the possibility that the end surface plate becomes loosened and comes off in the axial direction. As a result, a clearance occurs between the end surface plate and the rotor yoke, with the possibility of the permanent magnet falling out.

Moreover, the end surface plate, in addition to a function for preventing the permanent magnet from falling out and short-circuiting of the magnetic flux produced from the permanent magnet, has a function for adjusting the weight balance of the rotor section with lightening holes formed in the end surface plate. Therefore, when the rotor section rotates, the end surface plate needs to be reliably prevented from rotating with respect to the shaft. However, as mentioned above, in a case where the end surface plate becomes loosened due to the difference in coefficient of linear expansion between the end surface plate and the shaft, there is a problem in that the end surface plate rotates in the circumferential direction.

In order to solve this problem, there may be considered a configuration in which the end surface plate is inserted on a shaft having a rotation detent (for example, a spline) provided thereon, to thereby prevent rotation of the shaft, and the axial direction fixation is achieved with a collar. However, there is a problem with this configuration in that there is an additional cost increase for providing the rotation detent, and since the plate thickness of the collar needs to be ensured to some extent, the weight of the motor increases.

The present invention has been achieved with consideration of the above circumstances, and a first object thereof is to provide a motor capable of realizing, with light weight and low cost, the prevention the permanent magnet from falling out, and an appropriate weight balance of the rotor section.

Moreover, a second object of the present invention is to provide a motor in which reliable fixation on the shaft can be achieved while improving manufacturing efficiency and reducing manufacturing cost, and in which it is possible to improve the characteristics of the motor by making uniform the stress distribution of the rotor section and the magnetic characteristic.

Furthermore, a third object of the present invention is to provide a motor in which it is possible to improve the cooling performance without reducing operating efficiency.

SUMMARY OF THE INVENTION

In order to achieve the above objects, the present invention employs the following measures. That is, an aspect of the present invention is a motor including: a rotatably supported shaft; and a rotor section press-fitted and fixed coaxially to the shaft, wherein the rotor section is provided with: a rotor yoke; a housing hole that is formed on an end surface of the rotor yoke along the axial direction of the shaft; a permanent magnet housed within the housing hole; and a pair of end surface plates: that have a ring-shaped plate that is provided so as to cover at least an opening section of the housing hole and that is made of a non-magnetic material, and a supporting plate that supports the ring-shaped plate, that is press-fitted and fixed on the shaft, and that has a coefficient of linear expansion equivalent to that of the shaft; that are provided on axial end portions of the rotor yoke; and that clamp the rotor yoke so as to hold the permanent magnet within the housing hole.

According to the above motor, the ring-shaped plate made of a non-magnetic material covers the opening section of the housing holes, and it is therefore possible to retain the permanent magnets. Consequently, it is possible to prevent the permanent magnet from becoming detached and falling out from the opening section, while preventing short-circuiting of the magnetic flux produced from the permanent magnet. Moreover, since there is employed a supporting plate that is separately provided from the ring-shaped plate and that has a coefficient of linear expansion equivalent to that of the shaft, when press-fitting and fixing the supporting plate on the shaft, the end surface plate can be easily fixed without depending on the surrounding temperature.

That is to say, the ring-shaped plate having a coefficient of linear expansion equivalent to that of the shaft is press-fitted and fixed on the shaft, and therefore the difference in coefficient of linear expansion between the shaft and the supporting plate becomes smaller. Consequently, when heat is developed in the motor, the supporting plate and the shaft do not become loosened, and it is possible to prevent the end surface plate from being loosened and consequently detached.

Therefore, it is possible to improve the retaining force of the end surface plate on the rotor yoke and the permanent magnet. That is to say, it is possible to prevent the ring-shaped plate from being loosened and detached in the axial direction, while preventing the permanent magnet from falling out. Furthermore, there is no need for use of a collar, which has been conventionally used in a case of employing an end surface plate entirely made of a non-magnetic material, and it is therefore possible to achieve miniaturization and weight reduction of the motor.

Moreover, by improving the retaining force of the end surface plate on the rotor yoke and the permanent magnet, it is possible to prevent the supporting plate from becoming loosened and rotating in the circumferential direction, and therefore the weight balance of the rotor section will not be impaired. Consequently, there is no need for providing a rotation detent on the shaft as has been conventionally practiced, or for applying complex processing to the non-magnetic material. That is to say, by only press-fitting the supporting plate, it is possible to achieve rotation detent with respect to the shaft. Therefore, the shape of the rotor section and the shaft can be simplified, and processing cost can be reduced as a result.

As has been described, according to the above motor, it is possible, with a reduced weight and at a low cost, to prevent falling out of the permanent magnet and magnetic short-circuiting, and to realize the appropriate weight balance of the rotor section.

It may be arranged such that the ring-shaped plate is clamped between a periphery portion of a first end surface of the supporting plate and the rotor yoke; the supporting plate is provided with a protruding section that projects from the first end surface toward the rotor yoke; and the protruding section is inserted into a center hole of the ring-shaped plate.

In this case, in a state where the protruding section of the supporting plate is inserted in the center hole of the ring-shaped plate, the ring-shaped plate is clamped between the periphery portion of the supporting plate and the rotor yoke, and it is therefore possible to restrict the movement of the ring-shaped plate in the radial and axial directions. As a result, it is possible, by means of the ring-shaped plate, to further firmly retain the permanent magnet and the rotor yoke.

It may be arranged such that a height of the protruding section is lower than a thickness of the ring-shaped plate; and the supporting plate, in a state where a radial center portion thereof is flexurally deformed toward the rotor yoke, is press-fitted and fixed on the shaft, so as to press the ring-shaped plate toward the rotor yoke in a periphery portion of the first end surface.

In this case, the supporting plate, in a state of being flexurally deformed, is press-fitted and fixed on the shaft, and consequently in the periphery portion of the supporting plate, the elastic force of the supporting plate is transmitted, via the ring-shaped plate, to the rotor yoke and the permanent magnet. As a result, the rotor yoke and the permanent magnet can be evenly pressed. Moreover, no clearance occurs between the ring-shaped plate, and the rotor yoke and the permanent magnet, and consequently the end surface of the permanent magnet and the end surface of the rotor yoke are retained in a state of being flush with each other. Therefore, it is possible, by means of the ring-shaped plate, to further firmly retain the permanent magnet and the rotor yoke, and also the axial direction movement of the permanent magnet is restricted. Consequently it is possible to reduce torque pulsation of the motor.

It may be arranged such that the protruding section is press-fitted into the center hole of the ring-shaped plate.

In this case, the supporting plate is press-fitted into the center hole of the ring-shaped plate, and consequently it is possible to press-fit the end surface plate with the supporting plate and the ring-shaped plate installed thereon, to the shaft. Therefore, the workability in installation can be improved.

It may be arranged such that the supporting plate includes a lightening section formed along the thickness direction of the supporting plate.

In this case, the lightening section is formed in the supporting plate, and it is therefore possible to achieve a weight reduction in the motor. Consequently, it is possible to increase the maximum rotational speed of the motor, and improve the output of the motor as a result. Moreover, on the circumference of the supporting plate where the lightening section is formed, the elastic force, compared to other regions, is higher, and it is therefore possible to easily flexurally deform the supporting plate. Furthermore, the elastic force of the supporting plate can be set by adjusting the shape of the lightening section, and it is therefore possible to improve manufacturing efficiency.

It may be arranged such that the supporting plate includes a thin wall section formed along the thickness direction of the supporting plate.

In this case, on the supporting plate there is formed the thin wall section along the thickness direction thereof, and consequently it is possible to achieve a weight reduction in the motor. Therefore, it is possible to increase the maximum rotational speed of the motor, and improve the output of the motor as a result. Moreover, on the circumference of the supporting plate where the thin wall section is formed, the elastic force is higher compared to the other regions, and it is therefore possible to easily flexurally deform the supporting plate. Furthermore, the elastic force of the supporting plate can be set by adjusting the thickness of the thin wall section. Therefore it is possible to improve manufacturing efficiency.

It may be arranged such that the shaft is provided with: a small-diameter section on which a first end surface plate among the pair of end surface plates is press-fitted; a medium-diameter section that has the rotor yoke press-fitted thereon and that has a diameter greater than that of the small-diameter section; and a first intermediate section that is arranged between the small-diameter section and the medium-diameter section, with a diameter that varies along the axial direction; and the first end surface plate is provided with a housing section capable of housing the first intermediate section, on an edge portion on the rotor yoke side in a press-fitting hole for the shaft.

In this case, the diameter of the medium-diameter section on which the rotor yoke is press-fitted and the diameter of the small-diameter section on which the first end surface plate is press-fitted, are different from each other on both sides of the first intermediate section, and consequently a clearance is created between the rotor yoke and the small-diameter section. Thus, in the region other than the medium-diameter section, it is possible to attach the rotor yoke on the shaft in a state where no press-fitting load is applied. Then when the rotor yoke comes near the first intermediate section, a press-fitting load is applied to the rotor yoke.

That is to say, the rotor yoke, from a state of having being spigotted, is press-fitted on the shaft, and therefore stable press-fitting is possible without creating galling even if there is a large interference. Moreover, it is possible to reduce the press-fitting stroke of the rotor yoke. As described above, manufacturing efficiency of the motor can be improved by improving the press-fitting of the rotor yoke.

Furthermore, the rotor yoke is press-fitted on the medium-diameter section and the first end surface plate is press-fitted on the small-diameter section, and consequently it is possible to set the interference for the rotor yoke and the first end surface plate to respectively have optimum interference. Thus, a difference in coefficient of linear expansion between the first end surface plate and the shaft is eliminated, and no clearance occurs between the first end surface plate and the shaft, and it is therefore possible to reliably fix the rotor section by only press-fitting. That is to say, there is no need for providing a rotation detent such as spline on the outer circumferential surface of the shaft as it has been conventionally practiced, and it is therefore possible to improve motor manufacturing efficiency while reducing manufacturing cost.

Moreover, on the first end surface plate, there is formed a housing section capable of housing the first intermediate section, and therefore press-fitting is not restricted by the first intermediate section when press-fitting the end surface plate. As a result, the first end surface plate is brought into contact with the rotor yoke, and it consequently becomes possible to prevent falling out of the permanent magnets from the housing holes.

It may be arranged such that the pair of end surface plates are further provided with a center hole in a radial center portion thereof; and the supporting plate, in a state where a radial center portion thereof is flexurally deformed toward the inside of the center hole, is press-fitted and fixed on the shaft, so as to press the ring-shaped plate toward the rotor yoke in a periphery portion of a first end surface of the supporting plate.

In this case, the ring-shaped plate made of a non-magnetic material covers the opening section of the housing holes, and it is therefore possible to retain the permanent magnets. Consequently, it is possible to prevent the permanent magnets from becoming detached and falling out from the opening section, while preventing short-circuiting of the magnetic flux produced from the permanent magnet. Moreover, since there is employed the supporting plate that is separately provided from the ring-shaped plate and that has a coefficient of linear expansion equivalent to that of the shaft, when press-fitting and fixing the supporting plate on the shaft, it is possible to easily prevent rotation of the end surface plate with respect to the shaft without depending on the surrounding temperature.

That is to say, the ring-shaped plate having a coefficient of linear expansion equivalent to that of the shaft is press-fitted and fixed on the shaft, and therefore the difference in coefficient of linear expansion between the shaft and the supporting plate becomes smaller. Consequently, when heat is developed in the motor, the supporting plate and the shaft do not become loosened, and it is possible to prevent the end surface plate from being loosened and consequently detached.

Moreover, the supporting plate, in a state of being flexurally deformed, is press-fitted and fixed on the shaft, and consequently in the periphery portion of the supporting plate, the elastic force of the supporting plate is transmitted, via the ring-shaped plate, to the rotor yoke and the permanent magnet. As a result, the rotor yoke and the permanent magnet can be evenly pressed. Moreover, no clearance occurs between the ring-shaped plate, and the rotor yoke and the permanent magnet, and consequently the end surface of the permanent magnet and the end surface of the rotor yoke are retained in a state of being flush with each other.

Therefore, it is possible, by means of the ring-shaped plate, to further firmly retain the permanent magnet and the rotor yoke, and also the axial direction movement of the permanent magnet is restricted. Consequently it is possible to reduce torque pulsation of the motor.

It may be arranged such that the shaft is further provided with: a large-diameter section that is formed on an axial opposite side to the small-diameter section with the medium-diameter section therebetween, with a diameter greater than that of the medium-diameter section, and that has a second end surface plate among the pair of end surface plates, press-fitted thereon; and a second intermediate section with a diameter that changes along the axial direction, between the medium-diameter section and the large-diameter section; an end surface on a rotor yoke side of the first end surface plate is arranged on a rotor yoke side of a border between the first intermediate section and the medium-diameter section; and an end surface on a rotor yoke side of the second end surface plate is arranged on a rotor yoke side of a border between the second intermediate section and the medium-diameter section.

In this case, the end surface on the rotor yoke side of the first end surface plate is arranged on the rotor yoke side of the border between the first intermediate section and the medium-diameter section, and the end surface on the rotor yoke side of the second end surface plate is arranged on the rotor yoke side of the border between the second intermediate section and the medium-diameter section. Consequently, the rotor yoke is reliably press-fitted and fixed at the medium-diameter section. That is to say, even in a case where allowable error in the rotor yoke is significant, variation in the dimension of the rotor yoke can be absorbed, and the end surface of the rotor yoke will not go beyond the border portion between each intermediate section and the medium-diameter section. Consequently, it is possible to press-fit and fix the entire rotor yoke at a fixation region of an optimum interference. Therefore, the rotor yoke can be retained more firmly, and it is possible to prevent the axial direction movement of the rotor yoke as a result. Moreover, the residual stress distribution of the rotor yoke is symmetric, and uniform magnetic characteristic can be achieved. As a result, the characteristics of the motor can be improved.

It may be arranged such that the housing section is provided with: a diameter expanded section in which the press-fitting hole is expanded; and a chamfered section in which the end edge portion is chamfered.

In this case, in the press-fitting hole of the end surface plate, there is formed a diameter expanded section where the diameter of a part thereof is expanded, and consequently it is possible to house, in the end surface plate, the first intermediate section of the shaft. Moreover, in the press-fitting hole, there is provided a chamfered section with the end edge portion thereof formed with a chamfer, and the opening edge of the diameter expanded section expands in a tapered shape. As a result, a clearance occurs between the chamfered section and the shaft. In this case, when press-fitting, it is possible to contain, within this clearance, abraded particles created between the shaft and the press-fitting member, and it is therefore possible to prevent the abraded particles from scattering.

It may be arranged such that the rotor section is further provided with a plurality of first lightening holes formed along an axial direction from an end surface of the rotor yoke, so as to be arranged on a radial inner side of the housing hole; the pair of end surface plates are further provided with a plurality of second lightening holes; and when seen from the axial direction, at least a part of each of the first lightening holes is exposed through the second lightening holes.

In this case, even if the cooling oil enters the first lightening hole, the cooling oil can be made flow out through the second lightening hole. That is to say, circulation of the cooling oil becomes possible, and cooling efficiency of the motor can be improved as a result. Moreover, there is no need for the partitioning plate as disclosed in the third conventional technique above, and therefore motor operating efficiency will not be reduced.

It may be arranged such that a diameter of a circumference passing through an outermost section in the radial direction of the second lightening hole, is greater than a diameter of a circumference passing through an outermost section in the radial direction of the first lightening hole.

In this case, the cooling oil that has entered the first lightening hole below the shaft will not be stopped by the end surface plate, and will flow out through the second lightening hole. Therefore, circulation of the cooling oil becomes possible, and cooling efficiency of the motor can be improved.

It may be arranged such that a distance from a central axis of the shaft to an innermost section in the radial direction of the second lightening hole, is shorter than a distance from the central axis to an innermost section in the radial direction of the first lightening hole.

In this case, the cooling oil that has entered the first lightening hole above the shaft will not be stopped by the end surface plate, and will flow out through the second lightening hole. Therefore, circulation of the cooling oil becomes possible, and cooling efficiency of the motor can be improved.

It may be arranged such that the first lightening hole is formed in a polygonal shape; and when seen from the axial direction, all of the corner sections of the first lightening hole are exposed through the second lightening holes.

In a state where the rotor yoke is rotating, the cooling oil that has entered the first lightening hole receives a centrifugal force, and concentrates at any one of the corner sections of the first lightening hole formed in a polygonal shape.

In this case, the cooling oil that has concentrated at any one of the corner sections of the first lightening hole will not be stopped by the end surface plate, and will flow out through the second lightening hole. Therefore, circulation of the cooling oil becomes possible, and cooling efficiency of the motor can be improved.

It may be arranged such that the end surface plate includes a protruding section that blocks an opening section of the housing hole, the protruding section being formed on a periphery portion of an end surface on a rotor yoke side of the end surface plate; and a diameter of a circumference passing through an innermost section in the radial direction of the protruding section, is greater than a diameter of a circumference passing through an outermost section in the radial direction of the first lightening hole.

In this case, between the rotor yoke and the end surface section, there is formed a groove section. Consequently, the cooling oil that has entered the first lightening hole will not be stopped by the end surface plate, and will flow out to the groove section. Therefore, circulation of the cooling oil becomes possible, and cooling efficiency of the motor can be improved. Moreover, there is no need for determining mutual positions of the rotor yoke and the end surface plate in the circumferential direction, and therefore the manufacturing process can be simplified.

It may be arranged such that the protruding section is configured by the ring-shaped plate.

In this case, the ring-shaped plate is configured with a non-magnetic material, and it is therefore possible to suppress magnetic flux short-circuiting via the end surface plate. Moreover, the supporting plate is configured with a material having a coefficient of linear expansion equivalent to that of the shaft, and it is therefore possible to maintain fixation of the end surface plate on the shaft even if heat develops in the motor due to its operation. Furthermore, between the rotor yoke and the supporting plate, there is formed a groove section with the inner circumferential surface of the ring-shaped plate serving as its bottom surface, and consequently the cooling oil that has entered the first lightening hole flows out to this groove section. Therefore, circulation of the cooling oil becomes possible, and cooling efficiency of the motor can be improved as a result.

It may be arranged such that the supporting plate, in a state where a center portion thereof is flexurally deformed toward the rotor yoke, is press-fitted and fixed on the shaft.

In this case, the ring-shaped plate is pressed toward the rotor yoke by the restoring force of the flexurally deformed supporting plate, and it is therefore possible to reliably prevent the permanent magnet from falling out from the housing hole. Also in this case, between the rotor yoke and the supporting plate, there is formed a groove section with the inner circumferential surface of the ring-shaped plate serving as its bottom surface, and consequently it is possible to improve cooling performance of the motor.

DETAILED DESCRIPTION OF THE INVENTION

Next, first and second embodiments of the present invention are described, with reference to the accompanying drawings. In the present embodiment, there is described a motor employed in a drive motor unit for a vehicle.

(Drive Motor Unit for a Vehicle)

Figure 1:
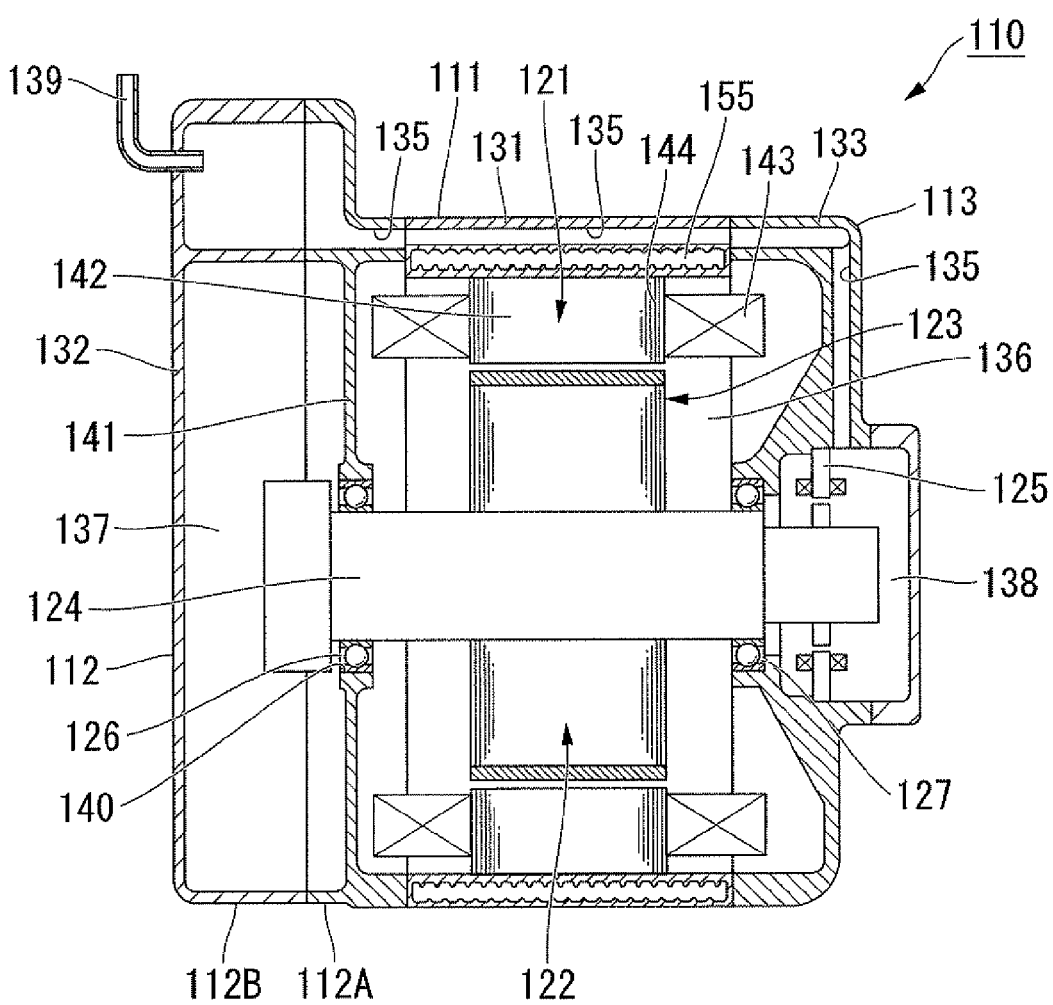
FIG. 1 is a schematic configuration sectional view of a motor unit according to a first embodiment of the present invention.

FIG. 1 is a schematic configuration sectional view of the drive motor unit for a vehicle.

As shown in FIG. 1, the drive motor unit for a vehicle (hereunder, referred to as motor unit) 110 is provided with: a motor housing 111 that houses a motor 123 provided with a stator section 121 and a rotor section 122; a transmission housing 112 that is fastened onto one axial side of the motor housing 111 and that houses a power transmission section (not shown in the drawing) that transmits power from an output shaft (shaft) 124 (made of iron for example) of the motor 123; and a sensor housing 113 that is fastened onto the other axial side of the motor housing 111 and that houses a rotation sensor 125 of the motor 123. The transmission housing 112 includes a shared housing 112A fastened onto the motor housing 111, and a gear housing 112B fastened onto the shared housing 112A. Moreover, inside the motor housing 111 there is formed a motor chamber 136, inside the transmission housing 112 there is formed a transmission chamber 137, and inside the sensor housing 113 there is formed a sensor chamber 138.

The motor housing 111 is of a substantially cylindrical shape so as to cover the whole of the motor 123.

The shared housing 112A is formed on the border between the motor housing 111 and the transmission housing 112. Between the motor housing 111 and the transmission housing 112 there is formed a partition wall 141 that separates the motor chamber 136 and the transmission chamber 137 from each other. In the radial center portion of this partition wall 141 there is formed a through hole 140 that passes through the partition wall 141 in the thickness direction. Within this through hole 140 there is inserted a bearing 126 that rotatably supports one end of the output shaft 124 of the motor 123. On the other hand, on the sensor housing 113 side of the border portion between the motor housing 111 and the sensor housing 113, there is inserted a bearing 127 that rotatably supports the other end of the output shaft 124 of the motor 123.

Within the motor unit 110 (the motor housing 111, the transmission housing 112, and the sensor housing 113), there is introduced cooling oil (not shown in the drawing) for cooling the bearings 126 and 127, the motor 123, and the like. The above-mentioned motor 123 is arranged in a state where a part of the stator section 121 is immersed in the cooling oil. Moreover, between the motor housing 111 and the transmission housing 112 there is provided an oil pump (not shown in the drawing). The cooling oil pumped up by the oil pump travels through an oil passage and circulates within the motor unit 110. The cooling oil circulating within this motor unit 110 is supplied to the bearings 126 and 127 and the like to thereby cool the bearings 126 and 127 and the like.

Moreover, in a wall section 131 of the motor housing 111, a wall section 132 of the transmission housing 112, and a wall section 133 of the sensor housing 113, there are respectively formed breather passages 135 that communicate with each other. The high pressure and high temperature air within the motor unit 110 can be discharged from a breather pipe 139 through the breather passages 135.

Furthermore, within the wall section 131 of the motor housing 111 and on the inner side to the breather passage 135, there is provided a water jacket 155 for cooling the motor 123 so as to cover the entire periphery of the stator section 121 in the motor 123. Moreover, the stator section 121 is shrink-fitted on the motor housing 111, and is arranged so as to be in close contact with the inner circumferential surface of the motor housing 111.

(Motor)

The motor 123 of the present embodiment is of an inner rotor type, and is provided with: the cylinder-shaped stator section 121; the column-shaped rotor section 122 arranged inside the stator section 121; and the output shaft 124 that is fixed coaxially to the rotor section 122 and is rotatably supported.

The stator section 121 is formed with magnetic plate materials 144 laminated in the axial direction, and is provided with teeth 142 that extend towards the radial inside. On these teeth 142, there is wound, via an insulator (not shown in the drawing), a coil 143.

First Embodiment

Figure 2:
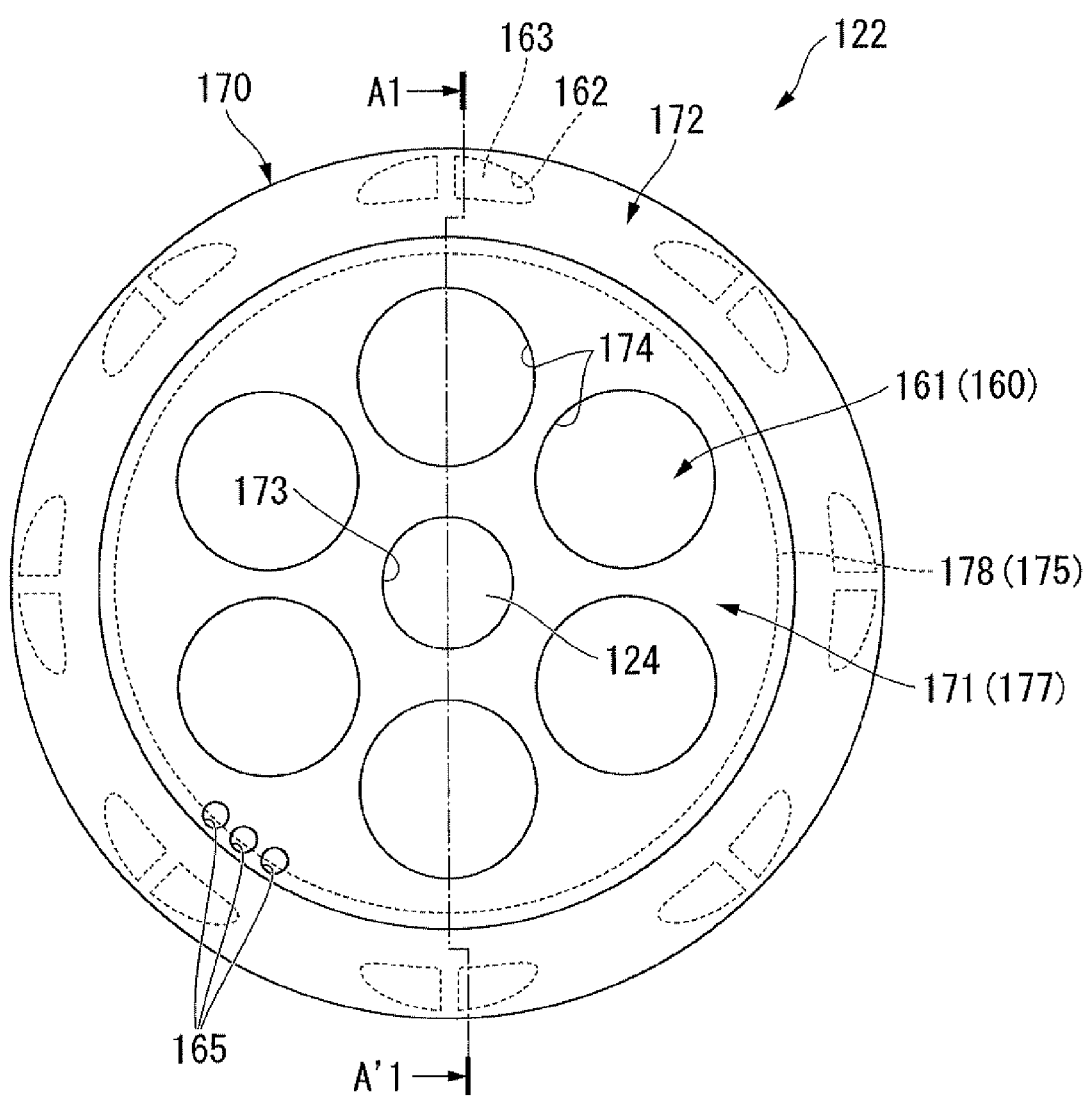
FIG. 2 is a plan view of a rotor section in the same embodiment.
Figure 3:
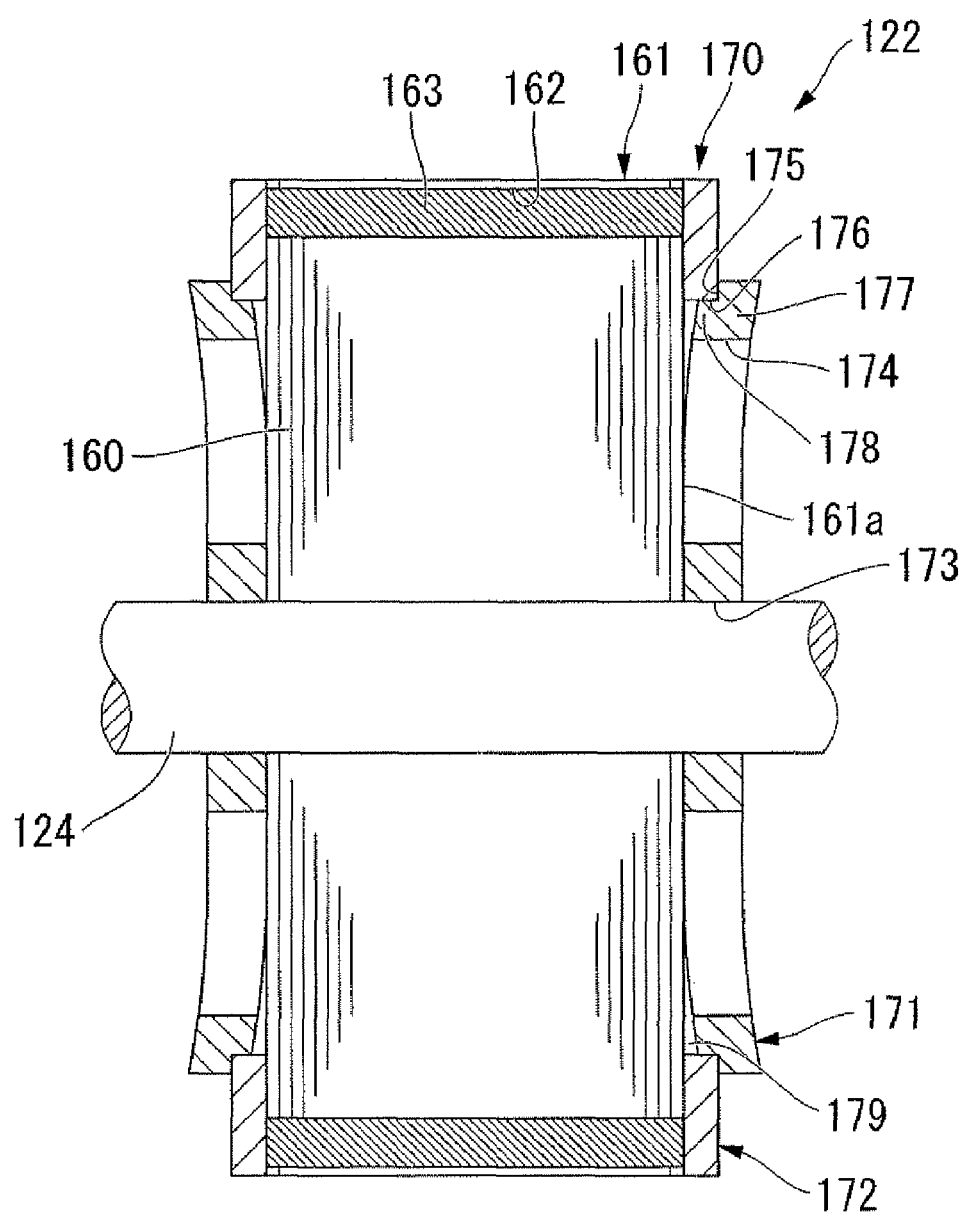
FIG. 3 is a sectional view taken along the line A1-A'1 of FIG. 2.

FIG. 2 is a side view of the rotor section, and FIG. 3 is a sectional view taken along the line A1-A'1 of FIG. 2.

As shown in FIG. 2 and FIG. 3, the rotor section 122 is arranged on the inner side of the above-mentioned stator 121 with a predetermined clearance therebetween. The rotor section 122 is provided with a rotor yoke 161 that is press-fitted and fixed on the output shaft 124. The rotor yoke 161 is formed with magnetic plate materials 160 laminated along the axial direction of the output shaft 124, and in the periphery portion of an end surface 161a thereof, there are formed a plurality of (for example, sixteen) housing holes 162 passing through in the axial direction of the rotor yoke 161. These housing holes 162, on the periphery portion of the end surface 161a of the rotor yoke 161, are arranged around the circumferential direction at equal intervals, and are of an arc shape or rectangular shape in plan view. In each of the housing holes 162 there is inserted a permanent magnet 163 made of a rare-earth material such as neodymium. The permanent magnets 163 are arranged along the axial direction, and the end surface of the permanent magnet 163 is arranged so as to be flush with the end surface of the rotor yoke 161. Since the plurality of divided permanent magnets 163 are used in this manner, it is possible to reduce eddy current loss that occurs in the permanent magnet 163.

Here, the rotor yoke 161 is clamped by a pair of end surface plates 170 provided on both axial end sides thereof. Each of the end surface plates 170 is provided with: a magnet plate (ring-shaped plate) 172 provided on the periphery portion of the end surface 161a of the rotor yoke 161; and an end plate (supporting plate) 171 that supports the magnet plate 172 and that is press-fitted and fixed on the output shaft 124. The pair of the end surface plates 170 both have the same configuration, and therefore one of the end surface plates 170 is described in the following description.

The magnet plate 172 is a ring-shaped member having a center hole 176 in the radial center portion thereof, and is provided so as to cover the periphery portion of the end surface 161*a* of the rotor yoke 161, that is, the opening section of the housing holes 162 of the rotor yoke 161. The end surface of the magnet plate 172 that faces the rotor yoke 161 (the end surface on the axial inner side), is in contact with the end surface 161*a* of the rotor yoke 161 and the end surface of the permanent magnets 163. That is to say, the magnet plate 172, in the periphery portion of the rotor yoke 161, is in contact with the end surface 161*a* of the rotor yoke 161 to prevent detachment of the magnetic plate materials 160, and has a function to retain the permanent magnets 163 and prevent the permanent magnets 163 from becoming detached and falling out from the housing holes 162. Moreover, the magnet plate 172 is configured with a non-magnetic material such as SUS304 or brass, and has a function to prevent short-circuiting of the magnetic flux produced from the permanent magnets 163.

The end plate 171 is of a circular disc shape and is made of a material having a coefficient of linear expansion equivalent to that of the output shaft 124 (for example, made of iron). In the radial center portion thereof there is formed a press-fitting hole 173 that passes there through in the thickness direction of the end plate 171. On the radial outer side of the press-fitting hole 173, there are formed, along the circumferential direction of the end plate 171, a plurality of (for example, six) lightening holes (lightening sections) 174.

The lightening holes 174 are round through holes passing through in the thickness direction of the end plate 171. By providing the lightening holes 174, it is possible to reduce the weight of the rotor section 122, and to easily allow flexural deformation in the end plate 171 as described later. Thus, the lightening holes 174 are formed in the end plate 171 and thereby the weight of the end plate 171 can be reduced. Consequently, it is possible to increase the maximum rotational speed of the motor 123 and improve the output of the motor as a result. Moreover, the end plate 171 has a higher mechanical strength compared to the magnet plate 172 which is made of a non-magnetic material. Therefore it is possible to arrange in the end plate 171, ribs between the lightening holes 174 which are positions that receive the maximum level of stress in the end surface plate 170. Furthermore, degree of freedom in layout of the lightening holes 174 can be improved.

Moreover, on the outer circumference portion of the end plate 171, there are formed a plurality of (for example, three) balance adjustment sections 165. With these balance adjustment sections 165, the weight balance of the rotor section 122 that has been assembled (press-fitted to the end surface plate 170) is adjusted. The balance adjustment sections 165 are formed by cutting out along the thickness direction of the end plate 171 with a drill or the like. Thus, on the end plate 171, which can be more easily processed compared to the magnet plate 172 that is made of a non-magnetic material, there are formed the balance adjustment sections 165 of the rotor section 122 and the lightening holes 174. Therefore it is possible to improve manufacturing efficiency while reducing manufacturing cost.

On the radial outer side of the lightening holes 174, that is, on the outer periphery of the end plate 171, there is formed a step section (first end surface) 175 in which the corner section of the outer periphery has been cut away in a cross-sectional L shape. This step section 175 is formed such that the outer periphery of the end surface of the end plate 171 (end surface on the axial inner side) facing the rotor yoke 161 is cut in the thickness direction, and it is formed around the entire circumference of the end plate 171. Therefore, the end plate 171 is configured with a large-diameter section 177 that is formed on the axial outer side, and a small-diameter section (protruding section) 178 that is formed projecting axially inward from the large-diameter section 177 in a state where the outer diameter thereof is reduced from that of the large-diameter section 177. In the present embodiment, the projection height of the small-diameter section 178 is formed so as to be lower than the thickness of the magnet plate 172.

The end plate 171 is fixed on the output shaft 124 in a state where the small-diameter section 178 thereof is press-fitted (lightly press-fitted) in the center hole 176 of the magnet plate 172. That is to say, the inner periphery of the magnet plate 172 is housed within the step section 175 of the end plate 171. In other words, the inner periphery of the magnet plate 172 is clamped between the outer periphery of the end plate 171 and the rotor yoke 161. As a result, the end surface plate 170 covers the entire surface of the end surface 161*a* of the rotor yoke 161 except for the regions corresponding to the lightening holes 174 of the end plate 171. At this time, between the end surface 161*a* of the rotor yoke 161 and the axial inner side end surface 171*a* of the end plate 171, there is a clearance 179 of just the difference between the thickness of the magnet plate 172 and the depth of the step section 175 of the end plate 171.

Here, the end plate 171, in a state of being flexurally deformed axially inward so as to fill in the above-mentioned clearance 179, is press-fitted and fixed within the center hole 176 of the magnet plate 172. Specifically, on the outer periphery of the end plate 171, the inner periphery of the magnet plate 172 is clamped at the step section 175 formed between the large-diameter section 177 and the small-diameter section 178. Meanwhile, the radial center portion of the end plate 171 is in a state of being flexurally deformed along the thickness direction (axial direction) of the end plate 171 toward the end surface 161*a* of the rotor yoke 161. That is to say, the end plate 171 is retained like a plate spring in a state of being flexurally deformed toward the axial inner side, and in the center portion of the end plate 171, it is in contact with the end surface 161*a* of the rotor yoke 161. Meanwhile, on the outer periphery of the end plate 171, the elastic force of the end plate 171 is transmitted to the rotor yoke 161 via the magnet plate 172. That is to say, the outer periphery of the end plate 171 presses the rotor yoke 161 toward the axial inner side with the magnet plate 172 sandwiched therebetween.

Consequently, the pair of the end surface plates 170 provided on both axial ends of the rotor yoke 161 clamp the rotor yoke 161, in a state of mutually pressing the rotor yoke 161 toward the axial inner side. A load F11 for press-fitting the rotor yoke 161 onto the shaft 124 is greater than a force F12 on the rotor yoke 161 from the magnet plate 172. Therefore, even if the magnet plate 172 presses the rotor yoke 161, the rotor yoke 161 will not move in the axial direction.

Thus, the end surface plate 170 of the present embodiment is provided with: the magnet plate 172 that is made of a non-magnetic material and that is provided so as to cover the opening section of the housing holes 162; and the end plate 171 that clamps the inner periphery of the magnet plate 172 while being press-fitted and fixed on the output shaft 124 and that has a coefficient of linear expansion equivalent to that of the output shaft 124.

According to this configuration, the magnet plate 172 made of a non-magnetic material covers the opening section of the housing holes 162 of the rotor yoke 161, and consequently it is possible to reliably retain the permanent magnets 163. Therefore, it is possible to prevent the permanent magnets 163 from becoming detached and falling out from the housing holes 162, while preventing short-circuiting of the magnetic flux produced from the permanent magnets 163. Moreover, since there is employed the end plate 171 that is separately provided from the magnet plate 172 and that has a coefficient of linear expansion equivalent to that of the output shaft 124, it is possible to easily fix the end surface plate 170 without depending on the surrounding temperature when press-fitting and fixing the end plate 171 on the output shaft 124. That is to say, the end plate 171 that has a coefficient of linear expansion equivalent to that of the output shaft 124 is press-fitted and fixed on the output shaft 124. Therefore the difference in coefficient of linear expansion between the output shaft 124 and the end plate 171 becomes smaller. As a result, when heat is developed in the motor, the end plate 171 and the output shaft 124 do not become loose, and it is possible to prevent the end surface plate 170 from being loosened and consequently detached.

Therefore, it is possible to improve the retaining force on the rotor yoke 161 and the permanent magnets 163 from the end surface plate 170. That is to say, it is possible to prevent the magnet plate 172 from being loosened and detached in the axial direction, and prevent the permanent magnets 163 from falling out. Furthermore, there is no need for use of a collar, which has been conventionally used in a case of employing an end surface plate entirely made of a non-magnetic material. Therefore it is possible to achieve miniaturization and weight reduction of the motor.

Moreover, by improving the retaining force on the rotor yoke 161 and the permanent magnet 163 from the end surface plate 170, it is possible to prevent the end plate 171 from becoming loosened and rotating in the circumferential direction. Therefore the weight balance of the rotor section 122 will not be impaired. Consequently, there is no need for providing a rotation detent on the output shaft as has been conventionally practiced, or for applying complex processing to the non-magnetic material. Specifically, only by press-fitting the output shaft 124 with the magnet plate 172 into the round hole (press-fitting hole 173) formed in the end plate 171, it is possible to achieve rotation detent with respect to the output shaft 124. Therefore, the shape of the rotor section 122 and the output shaft 124 can be simplified, and processing cost can be reduced as a result.

As has been described, according to the motor unit 110 of the present embodiment, it is possible, with a light weight and low cost, to prevent falling out of the permanent magnets 163 and magnetic short-circuiting, and to realize an appropriate weight balance of the rotor section 122.

Furthermore, the magnet plate 172 is clamped between the periphery portion of the end plate 171 and the rotor yoke 161 in a state where the small-diameter section 178 of the end plate 171 is press-fitted. Therefore it is possible to restrict the movement of the magnet plate 172 in the radial direction and axial direction. As a result, it is possible, with the magnet plate 172, to more firmly retain the permanent magnet 163 and the rotor yoke 161.

Moreover, the end plate 171 is press-fitted and fixed on the output shaft 124 in a state of being flexurally deformed. Therefore in the periphery portion of the end plate 171, the elastic force of the end plate 171 is transmitted, via the magnet plate 172, to the rotor yoke 161 and the permanent magnets 163. As a result, the rotor yoke 161 and the permanent magnets 163 can be evenly pressed. That is to say, the rotor yoke 161 is clamped, by the pair of the end surface plates 170, in a state of being pressed toward the axial inner side. Therefore, it is possible to more firmly retain the permanent magnets 163 and the rotor yoke 161. Moreover, no clearance occurs between the magnet plate 172 and the rotor yoke 161 and the permanent magnets 163. Therefore the end surface of the permanent magnets 163 and the end surface 161a of the rotor yoke 161 are retained in a state of being flush with each other. As a result, the movement of the permanent magnets 163 is restricted. Therefore it is possible to reduce torque pulsation of the motor 123.

Moreover, since the permanent magnets 163 do not project from the end surface 161a of the rotor yoke 161, it is possible to suppress cost increase associated with use of expensive materials such as for neodymium magnets. Furthermore, since no clearance occurs between the permanent magnets 163 and the magnet plate 172, the cooling oil, even in the event of being scattered, is unlikely to enter therebetween. As a result, it is possible to suppress deterioration of the permanent magnets 163.

Furthermore, since the end plate 171 is lightly press-fitted on the inner side of the magnet plate 172, it is possible to press-fit on the output shaft 124, the end surface plate 170 assembled with the end plate 171 and the magnet plate 172. Therefore, workability at the time of assembly can be improved. Moreover, the amount of non-magnetic material used can be reduced, and hence material cost can also be reduced.

Moreover, on the periphery of the end plate 171 where the lightening holes 174 are formed, the elastic force is higher compared at the other regions (outer peripheral edge and inner peripheral edge of the end plate 171). Therefore it is possible to easily flexurally deform the end plate 171. Furthermore, the elastic force of the end plate 171 can be set by adjusting the shape of the lightening holes 174, and hence it is possible to improve manufacturing efficiency.

Second Embodiment

Next, a second embodiment of the present invention is described. In the following description, parts having a similar structure to those in the above first embodiment are denoted by the same reference symbols and detailed descriptions thereof are omitted.

Figure 4:
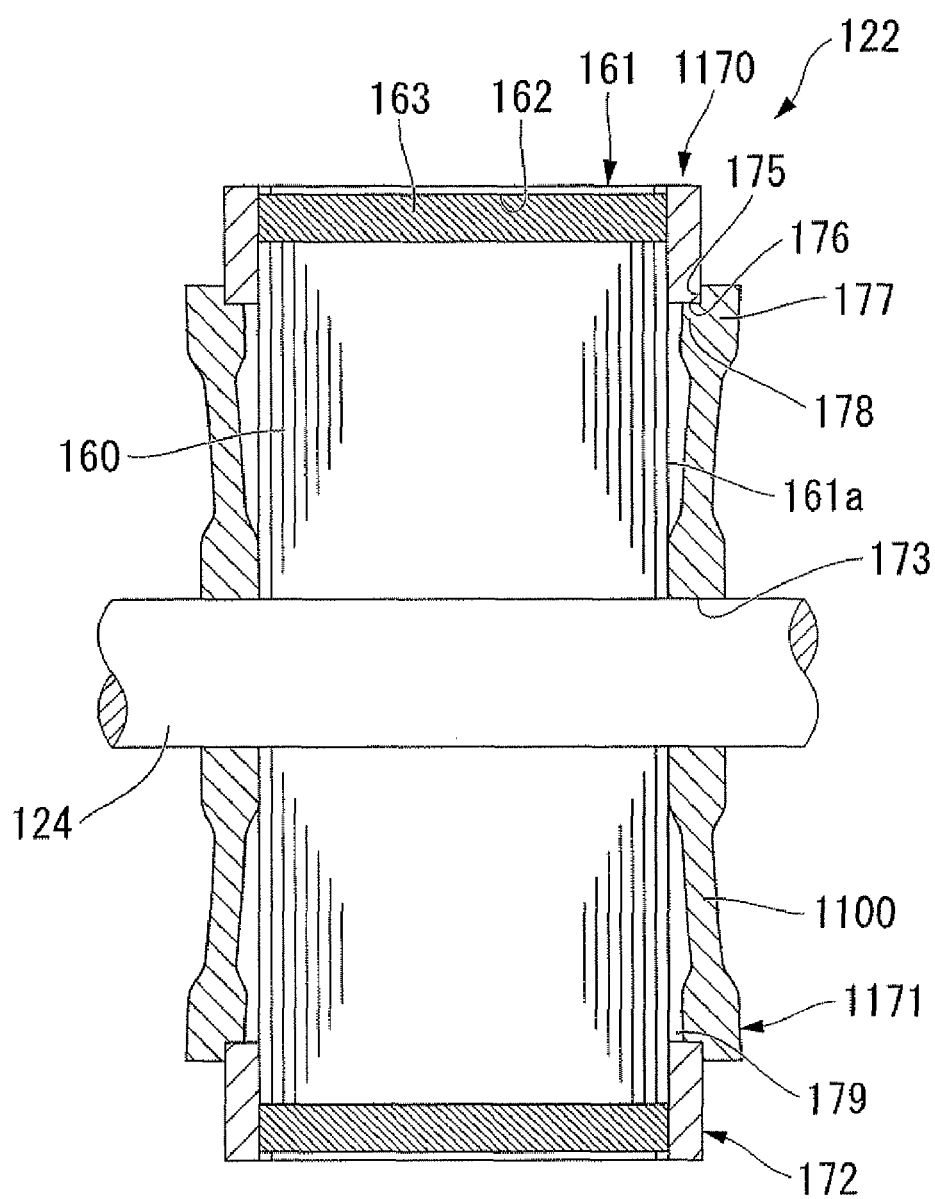
FIG. 4 is a sectional view of a rotor section according to a second embodiment of the present invention.

FIG. 4 is a sectional view of a rotor section according to the second embodiment of the present invention.

As shown in FIG. 4, an end surface plate 1170 of the present embodiment is such that instead of the lightening holes 174 (refer to FIG. 3) of the end plate 171 in the above-mentioned first embodiment, between the inner periphery portion and the outer periphery portion of the end plate 1171, there is formed a thin wall section 1100 that is thinner than the thickness of the inner periphery portion and the outer periphery portion.

The thin wall section 1100 is formed between the small-diameter section of the end plate 1171, that is, the press-fitting hole 173 of the end plate 1171, and the center hole 176 of the magnet plate 172. The thickness of the thin wall section 1100 is reduced from both thickness-direction sides of the end plate 1171. Moreover, the thin wall section 1100 is formed completely around the end plate 1171 in the circumferential direction.

Thus, according to the present embodiment, since the thin wall section 1100 is formed on the end plate 1171, it is possible to achieve a weight reduction in the motor 123. Therefore, it is possible to increase the maximum rotational speed of the motor 123, and improve the output of the motor as a result.

Moreover, on the circumference of the end plate 1171 where the thin wall section 1100 is formed, the elastic force is higher compared to the other regions (outer periphery and inner periphery of the end plate 1171), and it is therefore possible to easily flexurally deform the end plate 1171. Furthermore, the elastic force of the end plate 1171 can be set by adjusting the thickness of the thin wall section 1100. Therefore it is possible to improve manufacturing efficiency.

The thin wall section 1100 need not be formed completely around the end plate 1171 in the circumferential direction as mentioned above. For example, it may be intermittently formed around the circumferential direction, that is to say, a plurality of thin wall sections may be formed at intervals.

Figure 5:
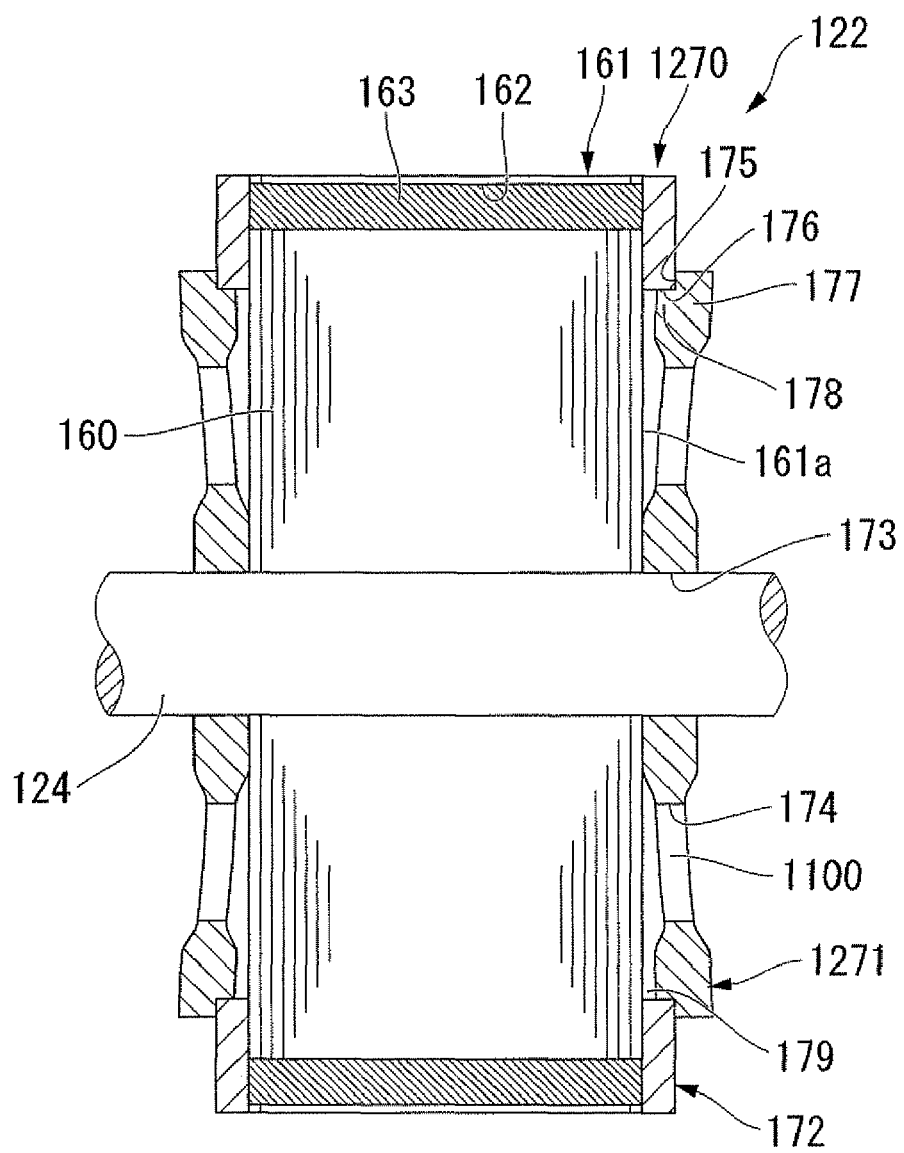
FIG. 5 is a sectional view of a rotor section according to a modified example of the same embodiment.

Moreover, as shown in FIG. 5, on an end plate 1271 of an end surface plate 1270, there may be formed both the above thin wall section 1100 and the lightening holes 174. In this case, since both the lightening holes 174 and the thin wall section 1100 are formed on the end plate 1271, a weight reduction in the motor 123 can be achieved, and adjustment of the elastic force of the end plate 1271 becomes easier.

The technical scope of the present invention is not limited to the above embodiments, and includes ones with various types of modifications added to the above embodiments without departing from the scope of the present invention. That is to say, the specific structures and shapes that have been illustrated in the embodiments are merely examples, and appropriate modifications may be made thereto.

Figure 6:
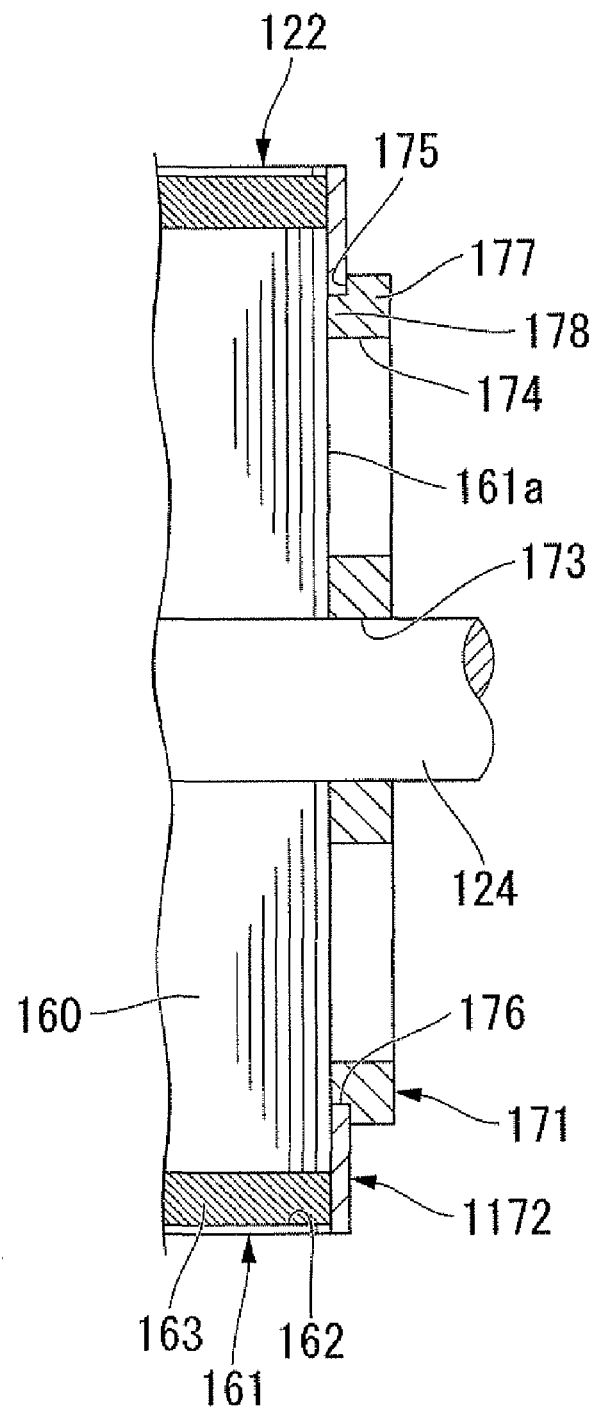
FIG. 6 is a plan view of a rotor section according to a modified example of the first embodiment.

In the above first embodiment, as shown in FIG. 3, in order to press-fit the end plate 171 in a state of being flexurally deformed, the height of the small-diameter section 178 of the end plate 171 is formed shallower than the thickness of the magnet plate 172. However, the height of the small-diameter section 178 may be formed equivalent to the thickness of the magnet plate 172. Specifically, as shown in FIG. 6, the thickness of the magnet plate 1172 may be made equivalent to the depth of the step section 175 of the end plate 171. In this case, the end plate 171 is in contact with the entire surface of the end surface 161a of the rotor yoke 161.

Moreover, in the above first embodiment, there has been described a case where the protruding section of the end plate is the small-diameter section that has a diameter smaller than that of the large-diameter section and that is formed so as to project from the large-diameter section (refer to FIG. 3). However, it is not limited to this, and appropriate design modifications may be made. For example, there may be employed a plurality of protruding sections that project from the axial inner side end surface so as to approach the inner periphery of the magnet plate, or a protruding section formed in a ring shape.

Moreover, in the above embodiment, there has been described a case where the end surface plate structure of the present invention is employed in the drive motor unit for a vehicle, however, it is not limited to this.

Third Embodiment

Next, a third embodiment of the present invention is described, with reference to the accompanying drawings. In the present embodiment, there is described a motor employed for a drive motor unit for a vehicle.

(Drive Motor Unit for a Vehicle)

Figure 7:
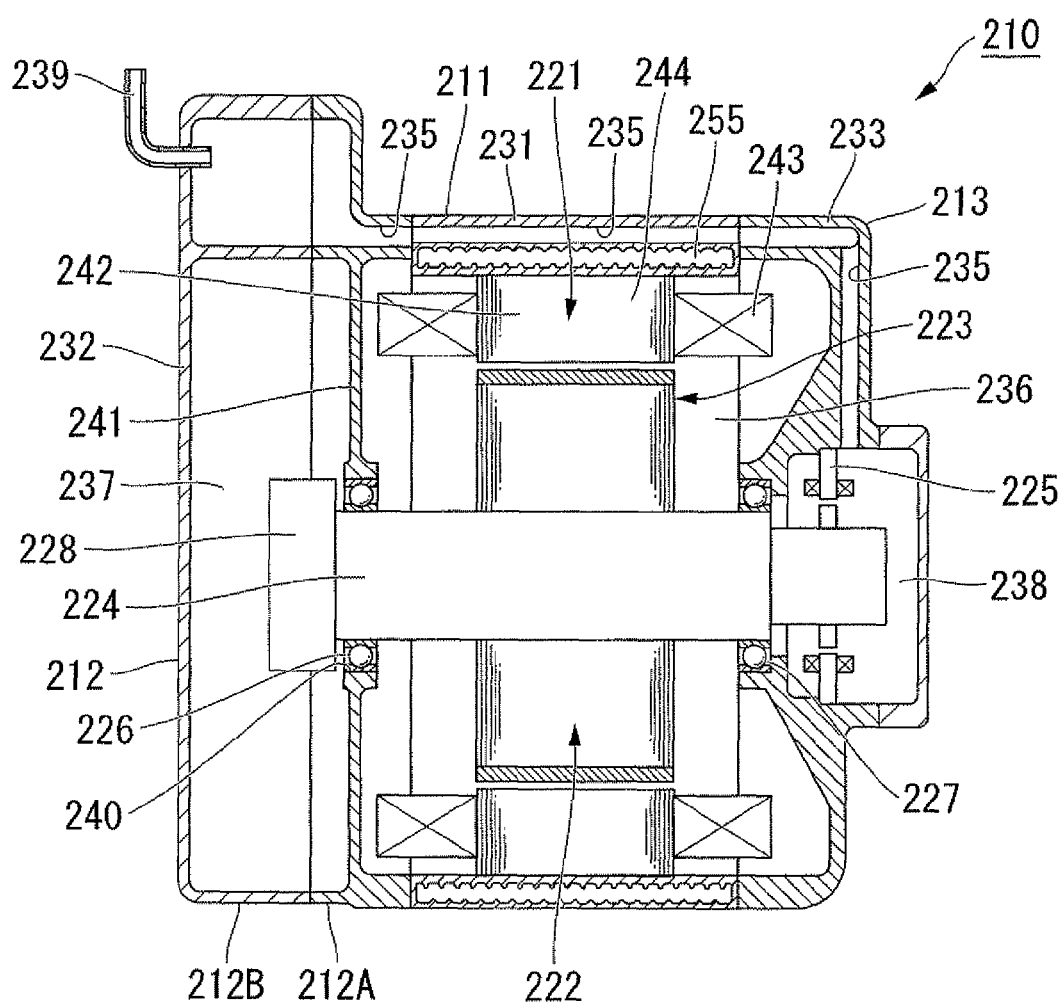
FIG. 7 is a schematic configuration sectional view of a motor unit according to a third embodiment of the present invention.

FIG. 7 is a schematic configuration sectional view of the drive motor unit for a vehicle.

As shown in FIG. 7, the drive motor unit for a vehicle (hereunder, referred to as motor unit) 210 is provided with: a motor housing 211 that houses a motor 223 provided with a stator section 221 and a rotor section 222; a transmission housing 212 that is fastened onto one axial side of the motor housing 211 and that houses a power transmission section (not shown in the drawing) that transmits power from an output shaft (shaft) 224 (made of iron for example) of the motor 223; and a sensor housing 213 that is fastened onto the other axial side of the motor housing 211 and that houses a rotation sensor 225 of the motor 223. The transmission housing 212 includes a shared housing 212A fastened onto the motor housing 211, and a gear housing 212B fastened onto the shared housing 212A. Moreover, inside the motor housing 211 there is formed a motor chamber 236, inside the transmission housing 212 there is formed a transmission chamber 237, and inside the sensor housing 213 there is formed a sensor chamber 238.

The motor housing 211 is of a substantially cylindrical shape so as to cover the whole of the motor 223.

The shared housing 212A is formed on the border between the motor housing 211 and the transmission housing 212. Between the motor housing 211 and the transmission housing 212 there is formed a partition wall 241 that separates the motor chamber 236 and the transmission chamber 237 from each other. In the radial center portion of this partition wall 241 there is formed a through hole 240 that passes through the partition wall 241 in the thickness direction. Within this through hole 240 there is inserted a bearing 226 that rotatably supports one end of the output shaft 224 of the motor 223. A helical gear 228 that meshes with a power transmission section within the transmission housing 212 is fixed to one end of the output shaft 224. On the other hand, on the sensor housing 213 side of the border portion between the motor housing 211 and the sensor housing 213, there is inserted a bearing 227 that rotatably supports the other end side of the output shaft 224 of the motor 223.

Within the motor unit 210 (the motor housing 211, the transmission housing 212, and the sensor housing 213), there is introduced cooling oil (not shown in the drawing) for cooling the bearings 226 and 227, the motor 223, and the like. The above-mentioned motor 223 is arranged in a state where a part of the stator section 221 is immersed in the cooling oil. Moreover, between the motor housing 211 and the transmission housing 212 there is provided an oil pump (not shown in the drawing). The cooling oil pumped up by the oil pump travels through an oil passage and circulates within the motor unit 210. The cooling oil circulating within this motor unit 210 is supplied to the bearings 226 and 227 and the like to thereby cool the bearings 226 and 227 and the like.

Moreover, in a wall section 231 of the motor housing 211, a wall section 232 of the transmission housing 212, and a wall section 233 of the sensor housing 213, there are respectively formed breather passages 235 that communicate with each other. The high pressure and high temperature air within the motor unit 210 can be discharged from a breather pipe 239 through the breather passages 235.

Furthermore, within the wall section 231 of the motor housing 211 and on the inner side to the breather passage 235, there is provided a water jacket 255 for cooling the motor 223 so as to cover the entire periphery of the stator section 221 in the motor 223. Moreover, the stator section 221 is shrink-fitted on the motor housing 211, and is arranged so as to be in close contact with the inner circumferential surface of the motor housing 211.

(Motor)

The motor 223 of the present embodiment is of an inner rotor type, and is provided with: the cylinder-shaped stator section 221; the column-shaped rotor section 222 arranged inside the stator section 221; and the output shaft 224 that is fixed coaxially to the rotor section 222 and is rotatably supported.

The stator section 221 is formed with magnetic plate materials 244 laminated in the axial direction, and is provided with teeth 242 that extend towards the radial inside. On these teeth 242, there is wound, via an insulator (not shown in the drawing), a coil 243.

Figure 8:
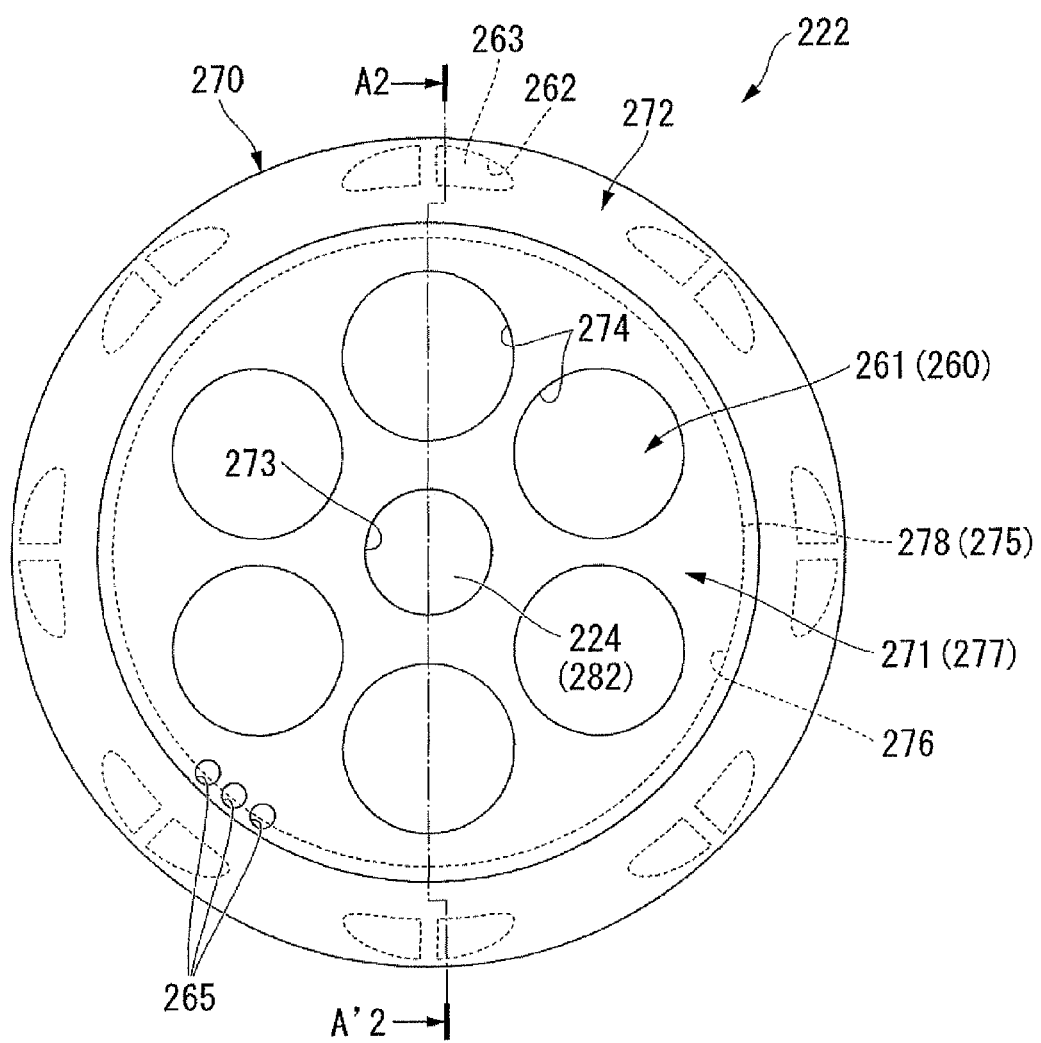
FIG. 8 is a plan view of a rotor section in the same embodiment of the present invention.
Figure 9:
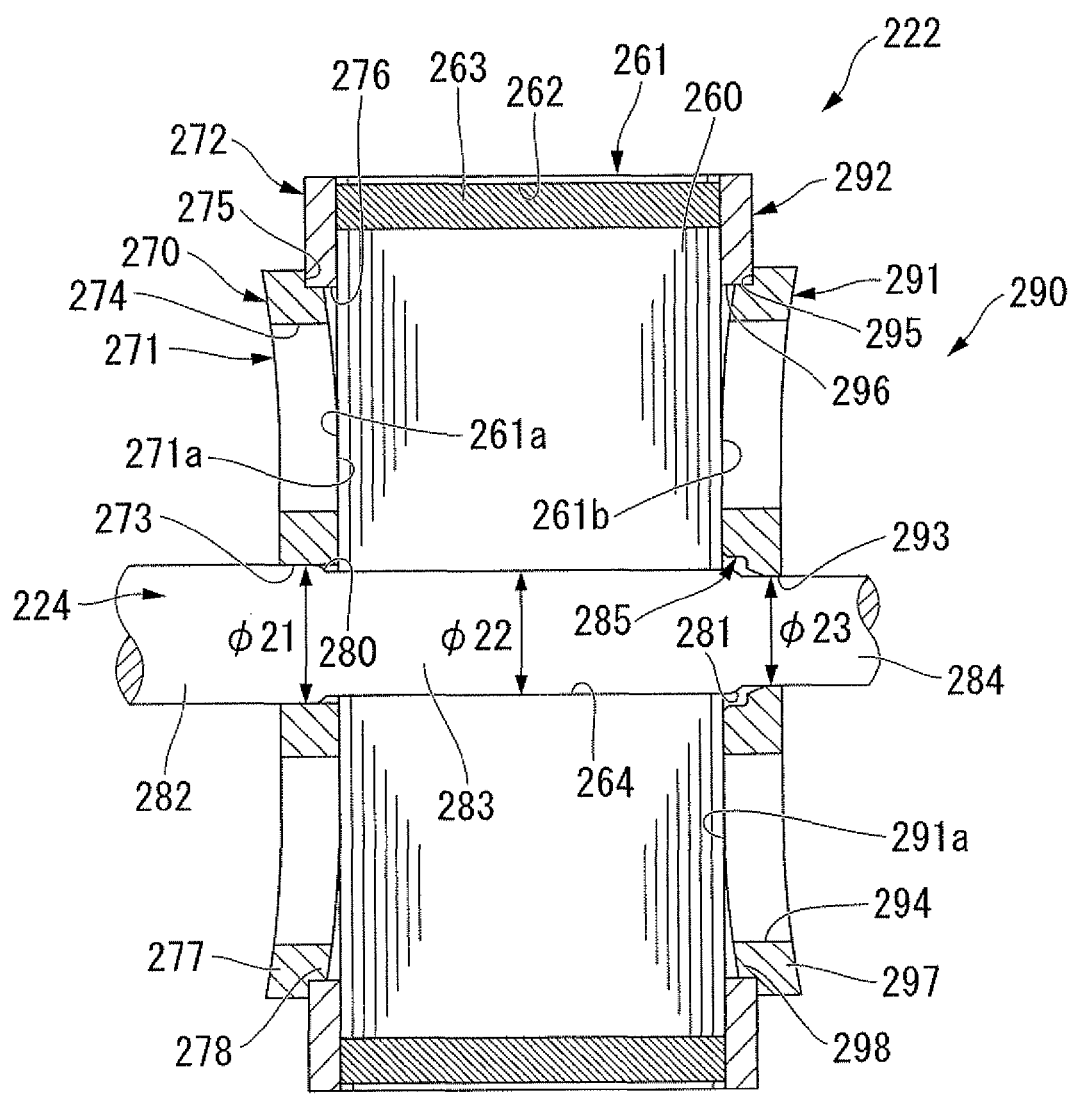
FIG. 9 is a sectional view taken along the line A2-A'2 of FIG. 8.

FIG. 8 is a side view of a rotor section, and FIG. 9 is a sectional view taken along the line A2-A'2 of FIG. 8. Moreover, FIG. 10 is an enlarged view of FIG. 9.

Figure 10:
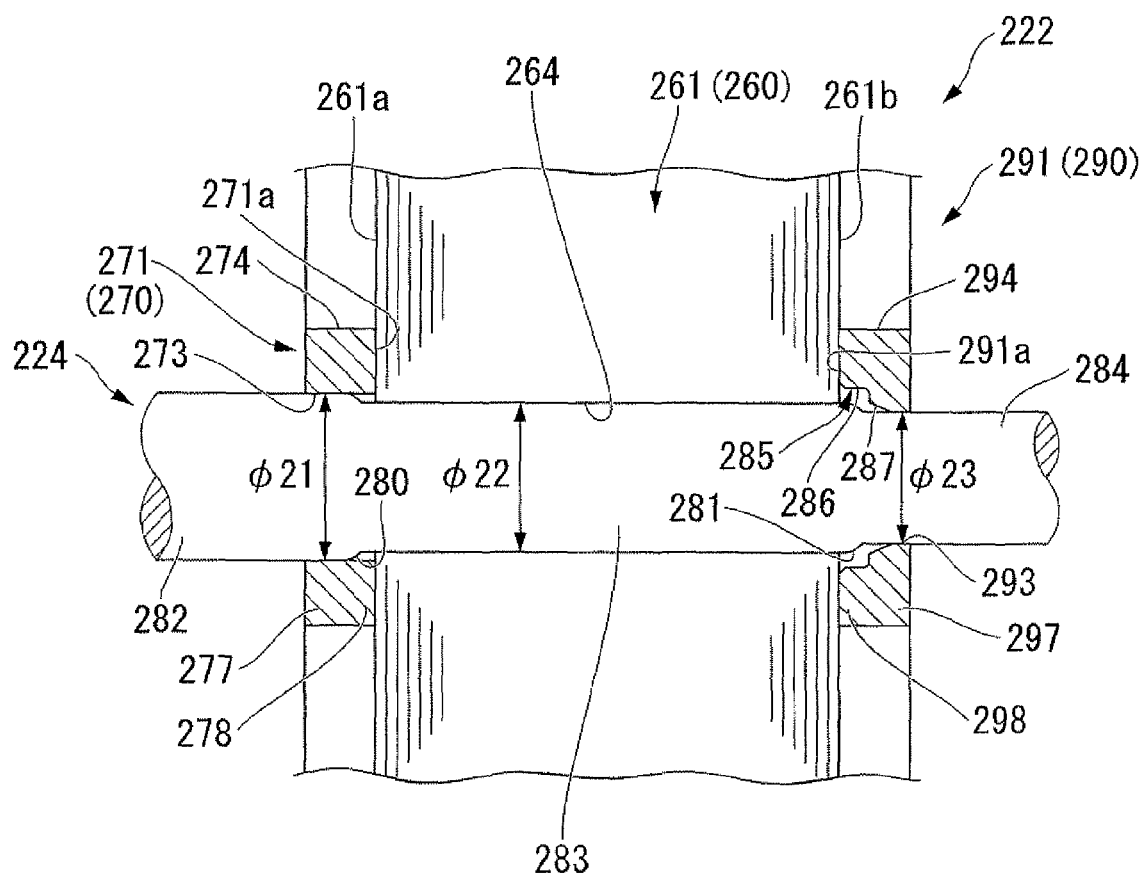
FIG. 10 is an enlarged view of the relevant section of FIG. 9.

As shown in FIG. 10, in a motor housing 211, an output shaft 224 is formed such that the diameter thereof becomes reduced in steps as it approaches from one end side of the output shaft 224 (transmission housing 212 side) to the other end side of the output shaft 224 (sensor housing 213 side). Specifically, the output shaft 224 includes: a large-diameter section 282 (for example, diameter φ1) formed on the one end side; a medium-diameter section 283 (for example, diameter φ2) that is formed on the other end side from the large-diameter section 282 and that has a diameter smaller than that of the large-diameter section 282; and a small-diameter section 284 (for example, diameter φ3) that is formed on the other end side from the medium-diameter section 283 and that has a diameter smaller than that of the medium-diameter section 283.

Furthermore, between the medium-diameter section 283 and the small-diameter section 284 there is formed a first intermediate section 281 in which the diameter gradually becomes reduced from the other end side of the medium-diameter section 283 to the one end side of the small-diameter section 284. Moreover, between the large-diameter section 282 and the medium-diameter section 283 there is formed a second intermediate section 280 in which the diameter gradually becomes reduced from the other end side of the large-diameter section 282 to the one end side of the medium-diameter section 283. These first intermediate section 281 and second intermediate section 280 are formed around the entire periphery of the output shaft 224, and are formed in an arc shape in side view.

As shown in FIG. 8 and FIG. 9, the rotor section 222 is arranged on the inner side of the above-mentioned stator 221 with a predetermined clearance therebetween. The rotor section 222 is provided with a rotor yoke 261 that is press-fitted and fixed on the medium-diameter section 283 of the output shaft 224. The rotor yoke 261 is formed with magnetic plate materials 260 laminated along the axial direction of the output shaft 224. In the radial center portion thereof there is formed a press-fitting hole 264 that passes therethrough in the thickness direction of the rotor yoke 261. The inside diameter of the press-fitting hole 264 is formed larger than the outside diameter of the small-diameter section 284 of the output shaft 224, and is formed smaller than the outside diameter of the medium-diameter section 283 so as to have an interference fit with the medium-diameter section 283. That is to say, the medium-diameter section 283 becomes a fixed area for the rotor yoke 261.

In the periphery portion of end surfaces 261a and 261b of the rotor yoke 161 there are formed a plurality of (for example, sixteen) housing holes 262 passing through in the axial direction of the rotor yoke 261. These housing holes 262, on the periphery portion of the end surfaces 261a and 261b of the rotor yoke 261, are arranged around the circumferential direction at equal intervals, and are of an arc shape or rectangular shape in plan view. In each of the housing holes 262 there is inserted a permanent magnet 263 made of a rare-earth material such as neodymium. The permanent magnets 263 are arranged along the axial direction, and the end surfaces of the permanent magnet 263 are arranged so as to be flush with the end surfaces 261a and 261b of the rotor yoke 261. Since the plurality of divided permanent magnets 263 are used in this manner, it is possible to reduce eddy current loss that occurs in the permanent magnet 163.

Here, as shown in FIG. 8 and FIG. 9, the rotor yoke 261 is clamped by a first end surface plate 290 and a second end surface plate 270 provided on both axial end sides thereof. The second end surface plate 270 is provided with: a magnet plate (ring-shaped plate) 272 provided on the periphery portion of the end surface 261a on one side of the rotor yoke 261; and an end plate (supporting plate) 271 that supports the magnet plate 272 and that is press-fitted and fixed on large-diameter section 282 of the output shaft 224.

The magnet plate 272 is a ring-shaped member having a center hole 276 in the radial center portion thereof, and is provided so as to cover the periphery portion of the end surface 261a of the rotor yoke 261, that is, the opening section of the housing holes 262 of the rotor yoke 261. The end surface of the magnet plate 272 that faces the rotor yoke 261 (the end surface on the axial inner side), is in contact with the end surface 261a of the rotor yoke 261 and the end surface of the permanent magnets 263. That is to say, the magnet plate 272, in the periphery portion of the rotor yoke 261, is in contact with the end surface 261a of the rotor yoke 261 to prevent detachment of the magnetic plate materials 260, and has a function to retain the permanent magnets 263 and prevent the permanent magnets 263 from becoming detached and falling out from the housing holes 262. Moreover, the magnet plate 272 is configured with a non-magnetic material such as SUS304 or brass. Therefore it has a function to prevent short-circuiting of the magnetic flux produced from the permanent magnets 263.

The end plate 271 is of a circular disc shape and is made of a construction material, for example iron or the like, having a coefficient of linear expansion equivalent to that of the output shaft 224. In the radial center portion thereof there is formed a press-fitting hole 273 that passes therethrough in the thickness direction of the end plate 271. The inside diameter of the press-fitting hole 263 is formed larger than the outside diameter of the medium-diameter section 283 of the output shaft 224, and is formed smaller than the outside diameter of the large-diameter section 282 so as to have an interference fit with the large-diameter section 282. That is to say, the large-diameter section 282 becomes a fixed area for the end plate 271.

On the radial outer side of the press-fitting hole 273, there are formed, along the circumferential direction of the end plate 271, a plurality of (for example, six) lightening holes 274. The lightening holes 274 are round through holes passing through in the thickness direction of the end plate 271. By providing the lightening holes 274, it is possible to reduce the weight of the rotor section 222, and to easily allow flexural deformation in the end plate 271 as described later. Thus, the lightening holes 274 are formed in the end plate 271 and thereby the weight of the end plate 271 can be reduced. Consequently, it is possible to increase the maximum rotational speed of the motor 223 and improve the output of the motor as a result. Moreover, the end plate 271 has a higher mechanical strength compared to the magnet plate 272 which is made of a non-magnetic material. Therefore it is possible to arrange in the end plate 271, ribs between the lightening holes 274 which are positions that receive the maximum level of stress in the second end surface plate 270. Furthermore, degree of freedom in layout of the lightening holes 274 can be improved.

Moreover, on the outer circumference portion of the end plate 271, there are formed a plurality of (for example, three) balance adjustment sections 265. The weight balance of the assembled rotor section 222 (press-fitted to the end surface plate 270) is adjusted with the balance adjustment sections 265. The balance adjustment sections 265 are formed by cutting out along the thickness direction of the end plate 271 with a drill or the like. Thus, on the end plate 271, which can be more easily processed compared to the magnet plate 272 that is made of a non-magnetic material, there are formed the balance adjustment sections 265 of the rotor section 222 and the lightening holes 274. Therefore it is possible to improve manufacturing efficiency while reducing manufacturing cost.

On the radial outer side of the lightening holes 274, that is, on the outer periphery of the end plate 271, there is formed a step section 275 in which the corner section of the outer periphery has been cut away in a cross-sectional L shape. This step section 275 is formed such that the outer periphery of the end surface 271a of the end plate 271 (end surface on the axial inner side) facing the rotor yoke 261 is cut in the thickness direction, and it is formed around the entire circumference of the end plate 271. Therefore, the end plate 271 is configured with a large-diameter section 277 that is formed on the axial outer side, and a small-diameter section 278 that is formed projecting axially inward from the large-diameter section 277 in a state where the outer diameter thereof is reduced from that of the large-diameter section 277. In the present embodiment, the projection height of the small-diameter section 278 is formed so as to be lower than the thickness of the magnet plate 272.

The end plate 271 is fixed on the output shaft 224 in a state where the small-diameter section 278 thereof is press-fitted (lightly press-fitted) in the center hole 276 of the magnet plate 272. That is to say, the inner periphery of the magnet plate 272 is housed within the step section 275 between the large-diameter section 277 and the small-diameter section 278 of the end plate 271. In other words, the inner periphery of the magnet plate 272 is clamped between the outer periphery of the end plate 271 and the rotor yoke 261. As a result, the second end surface plate 270 covers the entire surface of the end surface 261a of the rotor yoke 261 except for the regions corresponding to the lightening holes 274 of the end plate 271. At this time, between the end surface 261a of the rotor yoke 261 and the axial inner side end surface 271a of the end plate 271, there is a clearance of just the difference between the thickness of the magnet plate 272 and the depth of the step section 275 of the end plate 271.

Here, the end plate 271, in a state of being flexurally deformed axially inward so as to fill in the above-mentioned clearance, is press-fitted and fixed within the center hole 276 of the magnet plate 272.

Specifically, on the outer periphery of the end plate 271, the inner periphery of the magnet plate 272 is clamped at the step section 275 formed between the large-diameter section 277 and the small-diameter section 278. Meanwhile, the radial center portion of the end plate 271 is in a state of being flexurally deformed along the thickness direction (axial direction) of the end plate 271 toward the end surface 261a of the rotor yoke 261. That is to say, the end plate 271 is retained, like a plate spring, in a state of being flexurally deformed toward the axial inner side, and in the center portion of the end plate 271, it is in contact with the end surface 261a of the rotor yoke 261. Specifically, the surface on the end surface 271a of the end plate 271 with which the end surface 261a of the rotor yoke 261 comes in contact, is arranged, in plan view, on the axial inner side from the border between the second intermediate section 280 and the medium-diameter section 283, and it is in contact with the end surface 261a of the rotor yoke 261, on the radial outer side of the medium-diameter section 283.

Meanwhile, on the outer periphery of the end plate 271, the elastic force of the end plate 271 is transmitted to the rotor yoke 261 via the magnet plate 272. That is to say, the outer periphery of the end plate 271 presses the rotor yoke 261 toward the axial inner side (other end side) with the magnet plate 272 sandwiched therebetween. A load for press-fitting the rotor yoke 261 onto the shaft 224 is greater than a force on the rotor yoke 261 from the magnet plate 272. Therefore, even if the magnet plate 272 presses the rotor yoke 261, the rotor yoke 261 will not move in the axial direction.

The first end surface plate 290 provided on the other end side of the rotor yoke 261, as with the above-mentioned second end surface plate 270, is provided with: a magnet plate 292 provided on the periphery portion of the end surface 261b on the other end side of the rotor yoke 261; and an end plate 291 that supports the magnet plate 292 and that is press-fitted and fixed on the small-diameter section 284 of the output shaft 224. The structures of the end plate 291 and the magnet plate 292 of the first end surface plate 290 are respectively same as those of the end plate 271 and the magnet plate 272 of the above-mentioned second end surface plate 270, and therefore descriptions of the parts having the same structures are omitted.

The magnet plate 292, as with the magnet plate 272 of the above-mentioned second end surface plate 270, is a ring-shaped member having a center hole 296 in the radial center portion thereof, and is provided so as to cover the periphery portion of the end surface 261b of the rotor yoke 261, that is, the opening section of the housing holes 262 of the rotor yoke 261.

The end plate 291, as with the end plate 271 of the above-mentioned second end surface plate 270, is provided with: a press-fitting hole 293 formed in the radial center portion thereof; and a plurality of lightening holes 294 formed around the circumferential direction of the end plate 291. The inner diameter of the press-fitting hole 293 is formed smaller than the outer diameter of the small-diameter section 284 of the output shaft 224 so that it has an interference fit with the small-diameter section 284. That is to say, the small-diameter section 284 is a region for fixing the end plate 291. Thus, the inner diameter of the press-fitting hole 273 of the above end plate 271, the inner diameter of the press-fitting hole 264 of the rotor yoke 261, and the inner diameter of the press-fitting hole 293 of the end plate 291, are formed so as to become smaller in steps in order of the end plate 271, the rotor yoke 261, and the end plate 291.

Moreover, the end plate 291 is configured with: a large-diameter section 297 that is formed on the radial outer side; and a small-diameter section 298 that has an outer diameter smaller than that of the large-diameter section 297 and that is formed projecting radially inward from the large-diameter section 297. Moreover, between the large-diameter section 297 and the small-diameter section 298, there is formed a step section 295 in which the corner section of the outer periphery of the end plate 291 is cut way in a cross-sectional L shape.

Here, on the inner periphery of an end surface 291a (end surface on the axial inner side) facing the rotor yoke 261 of the end plate 291, that is, the axial inner side end edge of the press-fitting hole 293, there is formed a housing hole 285. The housing hole 285 is configured with: a diameter expanded section 286 formed with the corner section of the inner periphery thereof cut away so as to expand the inner diameter of the press-fitting hole 293; and a chamfered section 287 formed with the end edge portion of the press-fitting hole 293 chamfered.

The diameter expanded section 286 is formed with the inner periphery of the press-fitting hole 293 is cut away in the thickness direction. The diameter expanded section 286 is formed around the entire circumference of the end plate 291.

The chamfered section 287 is formed so as to straddle the opening edge of the diameter expanded section 286, that is, the edge line of the corner that is formed when forming the diameter expanded section 286. The chamfered section 287 is formed around the entire circumference of the end plate 291. That is to say, since the chamfered section 287 is formed so as to straddle the edge line of the opening edge of the diameter expanded section 286, the opening edge of the diameter expanded section 286 is expanded in a tapered shape. As a result, a clearance is created between the chamfered section 287 and the output shaft 224.

The end plate 291, as with the above-mentioned end plate 271, is press-fitted and fixed on the output shaft 224 in a state of being flexurally deformed toward the axial inner side. The end plate 291 is retained, like a plate spring, in a state of being flexurally deformed toward the axial inner side, and in the center portion of the end plate 291, it is in contact with the end surface 261b of the rotor yoke 261. Specifically, the surface on the end surface 291a of the end plate 291, with which the end surface 261a of the rotor yoke 261 comes in contact, is arranged, in plan view, on the axial inner side from the border between the first intermediate section 281 and the medium-diameter section 283, and it is in contact with the end surface 261b of the rotor yoke 261, on the radial outer side of the medium-diameter section 283. At this time, the region in the output shaft 224 from the other end side of the medium-diameter section 283 to the border between the small-diameter section 284 and the first intermediate section 281, is housed within the housing section 285 formed in the end plate 291. That is to say, the housing section 285 and the first intermediate section 281 become a spigotted structure. The housing section 285 is formed so as to allow the first intermediate section 281 to go therethrough and cover the other end side of the medium-diameter section 283.

On the outer periphery of the end plate 291, the elastic force of the end plate 291 is transmitted to the rotor yoke 261 via the magnet plate 292. That is to say, the outer periphery of the end plate 291 presses the rotor yoke 261 toward the axial inner side (the one end side) with the magnet plate 292 therebetween. The load for press-fitting the rotor yoke 261 onto the shaft 224 is greater than the force of the magnet plate 292 to press the rotor yoke 261. Therefore even if the magnet plate 292 presses the rotor yoke 261, the rotor yoke 261 will not move in the axial direction.

Consequently, the pair of the end surface plates 270 and 290 provided on both axial ends of the rotor yoke 261 clamp the rotor yoke 261, in a state of mutually pressing the rotor yoke 261 toward the axial inner side.

(Method for Manufacturing Motor)

Next, a method for manufacturing a motor is described, with reference to FIG. 11 to FIG. 15. In the following description, there is primarily described a method of press-fitting an output shaft when installing a rotor section on the output shaft. FIG. 11 to FIG. 15 are process drawings respectively showing a method of press-fitting an output shaft.

First, a jig to be used in the press-fitting method of the present embodiment is described.

As shown in FIG. 11 to FIG. 15, a jig 2100 of the present embodiment is provided with a rectangular solid-shaped base section 2101. The height of the base section 2101 is set to the distance from the other end of the output shaft 224 to the end surface 261b of the rotor yoke 261 when the rotor yoke 261 is press-fitted and fixed on the output shaft 224. In the base section 2101 there is formed a housing hole 2102 passing therethrough along the thickness direction (height direction). The housing hole 2102 is to receive the output shaft 224 when press-fitting the output shaft 224, and the inner diameter thereof is formed at least greater than the outer diameter of the medium-diameter section 283 of the output shaft 224. A top surface 2103 of the base section 2101 is formed parallel with the horizontal direction, and this top surface 2103 constitutes the loading surface for a rotor section 222.

Next, a method for press-fitting the output shaft is described. On one end side of the output shaft 224 of the present embodiment, there is preliminarily fixed a helical gear 228, and the constituents of the rotor section 222 are press-fitted from the other end side of the output shaft 224.

First, the magnet plates 272 and 292 are respectively press-fitted into the end plates 271 and 291 to respectively create the second end surface plate 270 and the first end surface plate 290.

Next, the second end surface plate 270 is set on the top surface 2103 of the base section 2101, and the output shaft 224 is press-fitted (press-fitting step). Specifically, a press-fitting load is applied to the output shaft 224 toward the press-fitting hole 273 of the second end surface plate 270 and the housing hole 2102 of the base section 2101. The output shaft 224 is formed so as to reduce its outer diameter in steps from one end side thereof to the other end side (refer to the large-diameter section 282, the medium-diameter section 283, and the small-diameter section 284 in FIG. 11). The inner diameter of the press-fitting hole 273 of the second end surface plate 270 is formed so as to have an interference fit with the large-diameter section 282. That is to say, the inner diameter of the press-fitting hole 273 of the second end surface plate 270 is formed at least greater than the outer diameter of the small-diameter section 284 of the output shaft 224, and therefore a clearance is present between the outer circumferential surface of the small-diameter section 284 and the inner circumferential surface of the press-fitting hole 273. Therefore, the output shaft 224 is smoothly inserted until the axial outer side inner periphery of the second end surface plate 270 has reached the second intermediate section 280. At the point where the second end surface plate 270 comes near the second intermediate section 280 of the output shaft 224, that is, the point where only the axial outer side inner periphery of the second end surface plate 270 has been press-fitted, the second end surface plate 270 and the output shaft 224 are removed from the housing hole 2102 of the base section 2101.

Next, the rotor yoke 261 is set on the top surface 2103 of the base section 2101. Specifically, the rotor yoke 261 is set so that the end surface 261b faces downward, to thereby bring the end surface 261b and the top surface 2103 of the base section 2101 in contact with each other. The output shaft 224 having the second end surface plate 270 press-fitted thereon is press-fitted on the rotor yoke 261 that has been set on the top surface 2103. The inner diameter of the rotor yoke 261 is formed greater than the outer diameter of the small-diameter section 284 of the output shaft 224. Therefore a clearance is present between the outer circumferential surface of the small-diameter section 284 and the inner circumferential surface of the press-fitting hole 264 and the press-fitting hole 273. Consequently, the output shaft 224 is smoothly inserted until the first intermediate section 281 of the output shaft 224 has reached the inner periphery of the press-fitting hole 264 of the rotor yoke 261.

At the point where the first intermediate section 281 of the output shaft 224 has reached the inner periphery of the press-fitting hole 264 of the rotor yoke 261, a press-fitting load F21 (refer to the outlined arrow in FIG. 11) for press-fitting the output shaft 224 into the rotor yoke 261 is applied to the output shaft 224. Then, the medium-diameter section 283 of the output shaft 224 is press-fitted into the press-fitting hole 264 while taking up the interference of the press-fitting hole 264 of the rotor yoke 261. When the medium-diameter section 283 has been press-fitted, the second end surface plate 270 fixed on the second intermediate section 280 of the output shaft 224 and the rotor yoke 261 come in contact with each other.

Figure 12:
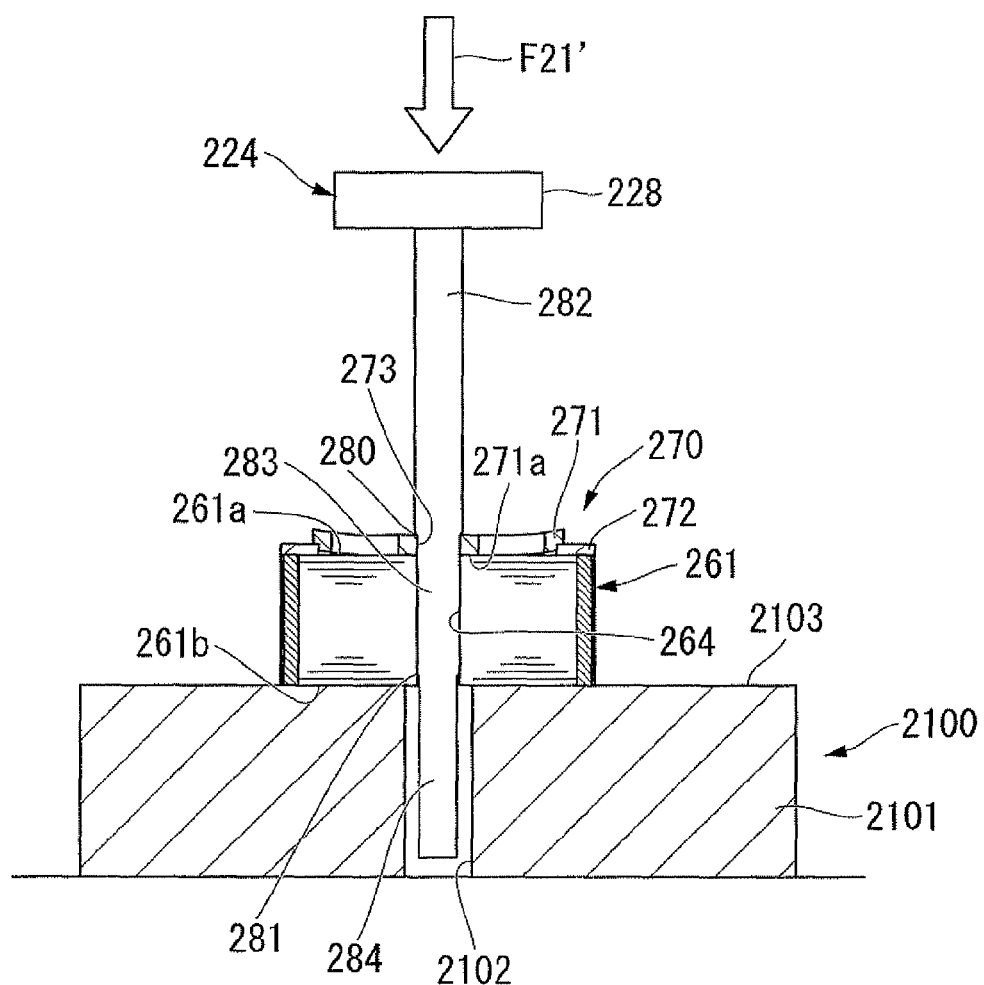
FIG. 12 is a process drawing showing a method of press-fitting the output shaft.
Figure 13:
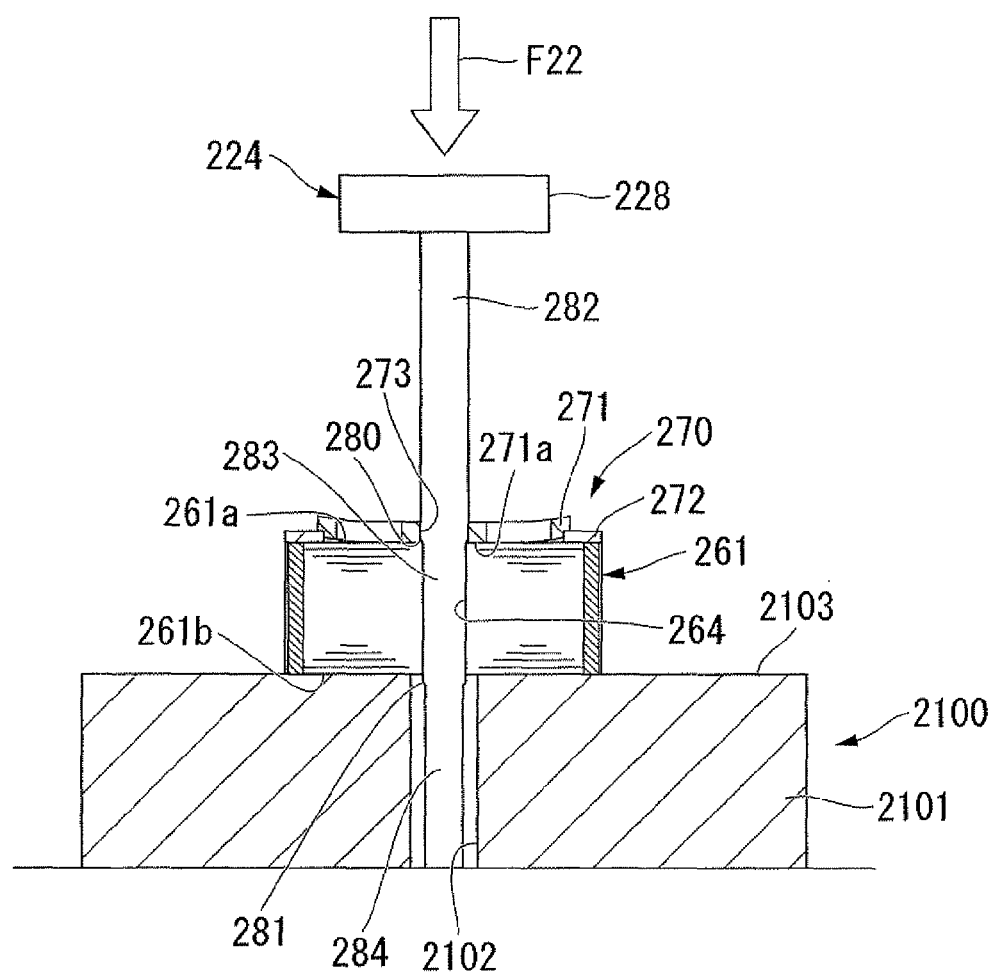
FIG. 13 is a process drawing showing a method of press-fitting the output shaft.

Subsequently, as shown in FIG. 12, a resultant force F21' of a flexural deformation load for flexurally deforming the end plate 271 of the second end surface plate 270, and the press-fitting load F21 for press-fitting the rotor yoke 261, is applied to the output shaft 224. The applied resultant force F21' is transmitted from the second intermediate section 280 to the inner periphery of the second end surface plate 270, and acts toward the axial direction inner side (in the thickness direction) of the end plate 271 of the second end surface plate 270. Thereby, the inner periphery of the end plate 271 flexurally deforms toward the axial inner side, and comes in contact with the end surface 261a of the rotor yoke 261. Then, as shown in FIG. 13, in a state where the end plate 271 is being flexurally deformed, a press-fitting load F22 (F22>F21'>F21) is applied and the output shaft 224 is further press-fitted, and thereby the second end surface plate 270 is press-fitted on the large-diameter section 282 of the output shaft 224. At this time, the rotor yoke 261 is press-fitted to the close proximity of the border between the medium-diameter section 283 and the second intermediate section 280, and at the same time, the other end of the output shaft 224 reaches the bottom surface of the base section 2101. As shown in FIG. 13, the height (depth) of the housing hole 2102 of the base section 2101 is formed so as to be equivalent to the distance from the other end of the output shaft 224 to the end surface 261b of the rotor yoke 261. Consequently, it is possible to stop press-fitting at the point where the rotor yoke 261 has been press-fitted to a predetermined position in the axial direction of the output shaft 224.

At this time, the end surface 261b of the rotor yoke is arranged on the axial inner side from the border between the medium-diameter section 283 of the output shaft 224 and the second intermediate section 280. Moreover, the contact surface of the end surface 271a of the end plate 271 and the end surface 261a of the rotor yoke 261, is arranged on the axial inner side from the border between the medium-diameter section 283 of the output shaft 224 and the second intermediate section 280. In order to always realize such relative positional relationship, the distance from the other end of the output shaft 224 to each border portion is set in consideration of variation in the dimension of the rotor yoke 261 and so forth. As described above, it is possible to easily perform pressing fitting and fixation without aligning, for every press-fitting, the axial direction position of the rotor yoke 261 and the second end surface plate 270. Thus, the rotor yoke 261 and the second end surface plate 270 are press-fitted and fixed on the output shaft 224.

Figure 14:
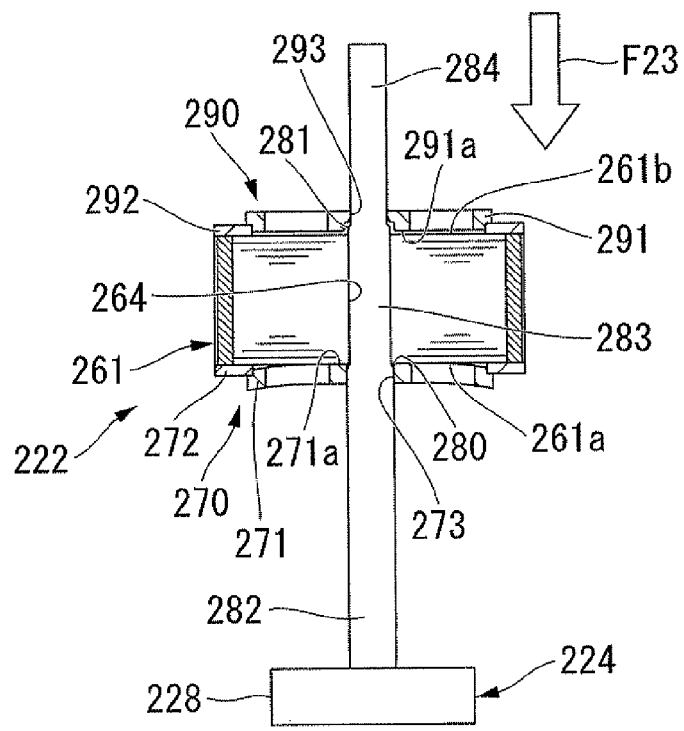
FIG. 14 is a process drawing showing a method of press-fitting the output shaft.

Next, as shown in FIG. 14, the output shaft 224 with the rotor yoke 261 and the second end surface plate 270 having been press-fitted and fixed thereon, is removed from the jig 2100, and the first end surface plate 290 is press-fitted from the other end side of the output shaft 224.

Specifically, to the center portion of the end plate 291 of the first end surface plate 290, there is applied a press-fitting load F23 (refer to the outlined arrow in FIG. 14) required for press-fitting the first end surface plate 290 on the output shaft 224. The first end surface plate 290 may be press-fitted with use of the above jig 2100. That is to say, having set the first end surface plate 290 on the top surface of the base section 2101, the output shaft 224 with the rotor yoke 261 and the second end surface plate 270 having been press-fitted and fixed thereon, may be press-fitted into the first end surface plate 290.

During the process of press-fitting the first end surface plate 290, the end surface of the magnet plate 292 comes in contact with the outer periphery of the end surface 261b of the rotor yoke 261. If a press-fitting load F24 (F21>F24>F23) is further applied to the end plate 291 in this state, the inner periphery of the end plate 291 becomes flexurally deformed toward the axial inner side, and comes in contact with the end surface 261b of the rotor yoke 261.

Figure 15:
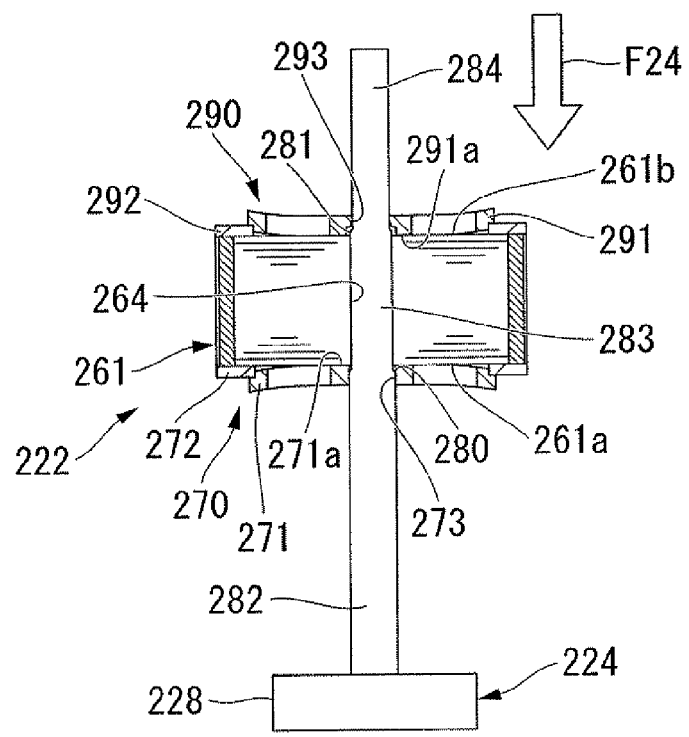
FIG. 15 is a process drawing showing a method of press-fitting the output shaft.

At this time, as shown in FIG. 10 and FIG. 15, the housing section 285 formed on the inner periphery of the end plate 291 houses the first intermediate section 281 formed between the medium-diameter section 283 and the small-diameter section 284. Thereby, the clearance between the end surface 291a of the end plate 291 and the end surface 261b of the rotor yoke 261 is taken up. As a result, the first intermediate section 281 of the output shaft 224 and the housing section 285 of the end plate 291 become a spigotted structure. Moreover, the end surface 291a of the end plate 291 and the end surface 261b of the rotor yoke 261 come in contact with each other on the medium-diameter section side from the border between the medium-diameter section 283 of the output shaft 224 and the first intermediate section 281. The pressing force F24 of the rotor yoke 261 by the magnet plate 292 that is caused by the flexural deformation in the end plate 291, is smaller than the press-fitting load F21 of the rotor yoke 261. Therefore, the rotor yoke 261 will not move in the axial direction while the first end surface plate 290 is being press-fitted.

Thus, the rotor section 222 is press-fitted and fixed on the output shaft 224.

As described above, the magnet plates 272 and 292 made of a non-magnetic material cover the opening section of the housing holes 262 of the rotor yoke 261, and consequently it is possible to reliably retain the permanent magnets 263. Therefore, it is possible to prevent the permanent magnets 263 from becoming detached and falling out from the housing holes 262, while preventing short-circuiting of the magnetic flux produced from the permanent magnets 263. Moreover, the magnet plates 272 and 292 are separately provided and have a coefficient of linear expansion equivalent to that of the output shaft 224. Therefore, when press-fitting and fixing the end plates 271 and 291 on the output shaft 224, it is possible to easily stop rotation of the end surface plates 270 and 290 with respect to the output shaft 224, without depending on the surrounding temperature. That is to say, since the end plates 271 and 291 having a coefficient of linear expansion equivalent to that of the output shaft 224 are press-fitted and fixed on the output shaft 224, the difference in coefficient of linear expansion between the output shaft 224, and the end plates 271 and 291 becomes smaller. Consequently, when heat is developed in the motor, the end plate 271 and the output shaft 224 do not become loose, and it is therefore possible to prevent the end surface plate 270 from being loosened and consequently detached.

Moreover, the end plates 271 and 291 are press-fitted and fixed on the output shaft 124 in a state of being flexurally deformed. Therefore in the periphery portion of the end plates 271 and 291, the elastic forces of the end plates 271 and 291 are transmitted, via the magnet plates 272 and 292, to the rotor yoke 261. As a result, the rotor yoke 261 and the permanent magnets 263 can be evenly pressed. Therefore, the pair of the end surface plates 270 and 290 can clamp the rotor yoke 261 in a state of pressing the rotor yoke 261 toward the axial inner side. As a result, it is possible to further firmly retain the permanent magnets 263 and the rotor yoke 261. Moreover, no clearance occurs between the magnet plates 272 and 292, and the rotor yoke 261 and the permanent magnets 263, and consequently the end surfaces of the permanent magnets 263 and the end surface 261a of the rotor yoke 261 are retained in a state of being flush with each other. Thereby, the movement of the permanent magnets 263 is restricted, and consequently it is possible to reduce torque pulsation of the motor 223.

In particular, in the present embodiment, there is employed a configuration in which on the inner periphery of the end plate 291 of the first end surface plate 290, there is provided the housing section 285 for housing the first intermediate section 281 of the output shaft 224.

Moreover, the diameter of the medium-diameter section 283 where the rotor yoke 261 has been press-fitted, and the diameter of the small-diameter section 284 where the first end surface plate 290 has been press-fitted, are different from each other on both sides of the first intermediate section 281. Therefore, a clearance is created between the rotor yoke 261 and the small-diameter section 284. Thus, in the region other than the medium-diameter section 283, it is possible to attach the rotor yoke 261 on the output shaft 224 in a state where no press-fitting load is applied. When the rotor yoke 261 comes near the first intermediate section 281, the press-fitting load F21 is applied to the rotor yoke 261. That is to say, the rotor yoke 261, from a state of having been spigotted, is press-fitted on the output shaft 224, and therefore stable press-fitting is possible without creating galling even if there is a large interference. Moreover, it is possible to reduce the press-fitting stroke of the rotor yoke 261. As described above, manufacturing efficiency of the motor 223 can be improved by improving the press-fitting of the rotor yoke 261.

Moreover, there is no need for providing a detent such as spline on the outer circumferential surface of the output shaft 224 as has been conventionally practiced. Therefore, it is possible to improve manufacturing efficiency of the motor 223 and reduce manufacturing cost.

Moreover, on the first end surface plate 290 there is formed the housing section 285 capable of housing the first intermediate section 281 of the output shaft 224. Therefore press-fitting is not restricted by the first intermediate section 281 when press-fitting the first end surface plate 290. As a result, the first end surface plate 290 is brought into contact with the rotor yoke 261, and it consequently becomes possible to prevent falling out of the permanent magnets 263 from the housing holes 262.

Furthermore, the rotor yoke 261 side end surface 291a of the first end surface plate 290 (end plate 291) is arranged on the axial inner side from the border between the first intermediate section 281 and the medium-diameter section 283, and the rotor yoke 261 side end surface 271a of the second end surface plate 270 (end plate 271) is arranged on the axial inner side from the border between the second intermediate section 280 and the medium-diameter section 283. Therefore, the rotor yoke 261 is reliably fixed on the medium-diameter section 283. That is to say, even in a case where allowable error in the rotor yoke 261 is significant, variation in the dimension of the rotor yoke 261 can be absorbed, and the end surfaces 261a and 261b of the rotor yoke 261 will not go beyond the border portion between the respective intermediate sections 280 and 281, and the medium-diameter section 283. Consequently, it is possible to press-fit and fix the entire rotor yoke 261 at a fixation region of an optimum interference. Therefore, the rotor yoke 261 can be retained more firmly, and it is possible to prevent the axial direction movement of the rotor yoke 261 as a result. Moreover, the residual stress distribution of the rotor yoke 261 is symmetric, and uniform magnetic characteristic can be achieved. As a result, the characteristics of the motor can be improved.

Moreover, in the end plate 291 there is provided the diameter expanded section 286 that is formed by cutting away the corner section of the inner periphery thereof. Therefore it is possible to house, in the end plate 291, the first intermediate section 281 of the output shaft 224. Furthermore, the chamfered section 287 is formed so as to straddle the edge line of the diameter expanded section 286, and consequently the opening edge of the diameter expanded section 286 is expanded in a tapered shape. As a result, a clearance is created between the chamfered section 287 and the output shaft 224. In this case, when press-fitting, it is possible to contain, within this clearance, abraded particles created between the output shaft 224 and the press-fitting member, and it is therefore possible to prevent the abraded particles from scattering.

The technical scope of the present invention is not limited to the above embodiments, and includes ones with various types of modifications added to the above embodiments without departing from the scope of the present invention. That is to say, the specific structures and shapes that have been illustrated in the embodiments are merely examples, and appropriate modifications may be made thereto.

Figure 16:
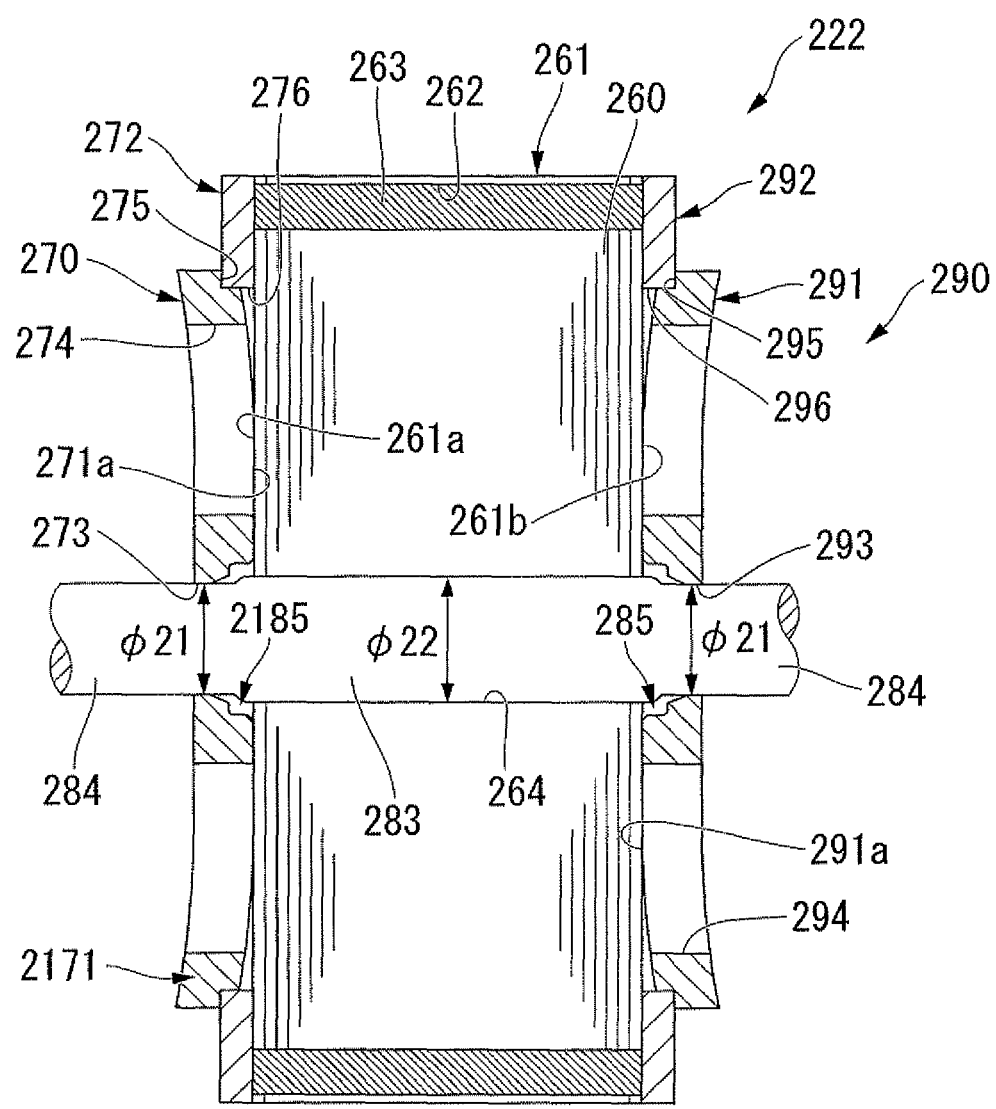
FIG. 16 is a sectional view of the rotor section according to a modified example of the same embodiment, corresponding to the sectional surface taken along the line A2-A'2 of FIG. 8.

In the present embodiment, there has been described a case where the rotor section 222 is press-fitted only from the other end side of the output shaft 224 as shown in FIG. 9. However, it is also possible to press-fit the pair of the end surface plates 270 and 290 so as to clamp the rotor yoke 261 from both end sides of the output shaft 224. Specifically, as shown in FIG. 16, on both end sides of the medium-diameter section 283 there is formed the small-diameter section 284 with an outer diameter smaller than that of the medium-diameter section 283. In the press-fitting hole 273 of the end plate 2171 of the second end surface plate 270, there is formed a housing section 2185 having a configuration the same as that of the housing section 285 of the first end surface plate 290.

Figure 11:
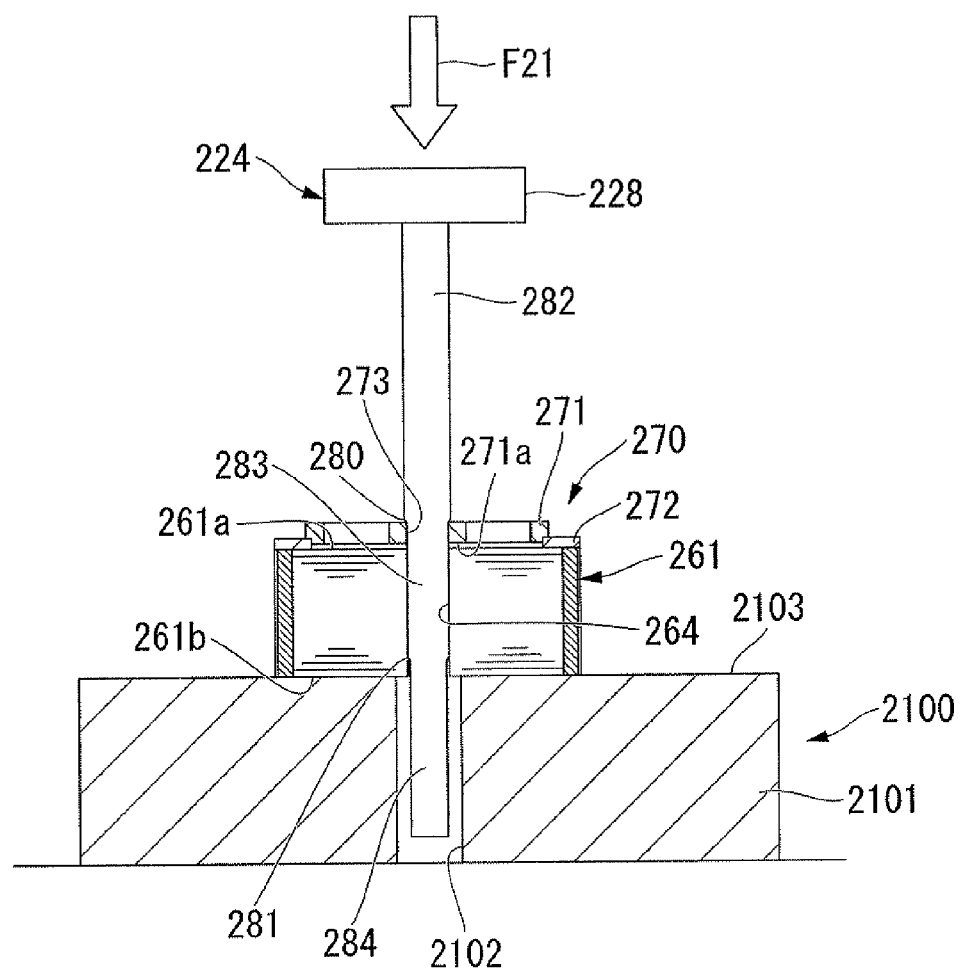
FIG. 11 is a process drawing showing a method of press-fitting an output shaft.

Furthermore, in the present embodiment, there has been described a case where the second end surface plate and the rotor yoke are press-fitted on the output shaft in this order. However, it is also possible to collectively press-fit the second end surface plate 270 and the rotor yoke 261. Specifically, first, as shown in FIG. 11, the rotor yoke 261 and the second end surface plate 270 are laminated and set on the base section 2101 of the jig 2100. By applying a press-fitting load to the output shaft 224 in this state, the rotor yoke 261 and the second end surface plate 270 are collectively press-fitted and fixed.

Moreover, in the present embodiment, there has been shown a configuration in which on the output shaft, there are formed the large-diameter section, the medium-diameter section, and the small-diameter section so that the outer diameter thereof becomes smaller in three steps as it gets closer from the one end side to the other end side. However, on the other end side of the output shaft there may be formed a region with an outer diameter smaller than that of the small-diameter section. That is to say, the small-diameter section may be formed only in the fixation region of the first end surface plate. In this case, the press-fitting stroke of the first end surface plate can be reduced, and therefore press-fitting can be further improved.

Moreover, in the above embodiment, there has been described a case where the motor of the present invention is employed in the drive motor unit for a vehicle, however, it is not limited to this.

Next, a fourth through seventh embodiments of the present invention are described, with reference to the accompanying drawings.

(Drive Motor Unit for a Vehicle)

Figure 17:
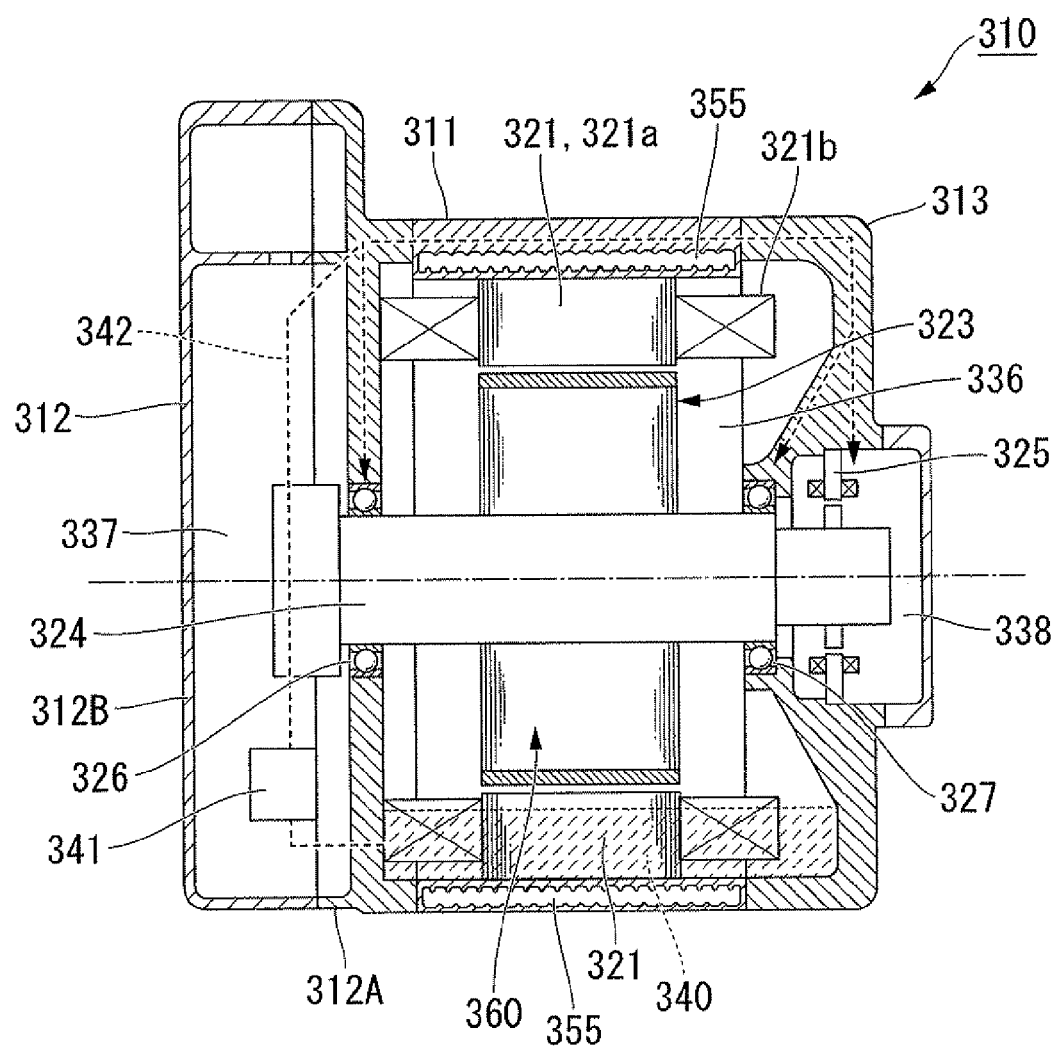
FIG. 17 is a schematic configuration sectional view of a drive motor unit for a vehicle.

FIG. 17 is a schematic configuration sectional view of the drive motor unit for a vehicle.

As shown in FIG. 17, the drive motor unit for a vehicle (hereunder, referred to as motor unit) 310 is provided with: a motor housing 311 that houses a motor 323 provided with a stator section 321 and a rotor section 322; a transmission housing 312 that is fastened onto one axial side of the motor housing 311 and that houses a power transmission section (not shown in the drawing) that transmits power from a shaft (shaft) 324 of the motor 323; and a sensor housing 313 that is fastened onto the other axial side of the motor housing 311 and that houses a rotation sensor 325 of the motor 323. The transmission housing 312 includes a shared housing 312A fastened onto the motor housing 311, and a gear housing 312B fastened onto the shared housing 312A. Moreover, inside the motor housing 311 there is formed a motor chamber 336, inside the transmission housing 312 there is formed a transmission chamber 337, and inside the sensor housing 313 there is formed a sensor chamber 338.

The motor housing 311 is of a substantially cylindrical shape so as to cover the whole of the motor 323.

Within the motor housing 311 there is provided a water jacket 355 for cooling the motor 323 so as to cover the entire periphery of the stator section 321. Moreover, the stator section 321 is shrink-fitted on the motor housing 311, and is arranged so as to be in close contact with the inner circumferential surface of the motor housing 311.

In a partition wall between the motor chamber 336 and the sensor chamber 338A there is fixed a bearing 327 that rotatably supports one end of the shaft 324. On the other hand, in a partition wall between the motor chamber 336 and the transmission chamber 337 there is fixed a bearing 326 that rotatably supports the other end of the shaft 324.

Within the motor unit 310 there is introduced cooling oil 340 for cooling the bearings 326 and 327, the motor 323, and the like. The above-mentioned motor 323 is arranged in a state where a lower part of the stator section 321 is immersed in the cooling oil 340. Moreover, an oil pump 341 is provided in transmission chamber 337. The cooling oil 340 pumped up by the oil pump 341 travels through an oil passage 342 and circulates within the motor unit 310. The cooling oil 340 circulating within this motor unit 310 is supplied to the bearings 326 and 327 and the like to thereby cool the bearings 326 and 327 and the like.

(Motor)

The motor 323 of the present embodiment is of an inner rotor type, and is provided with: the cylinder-shaped stator section 321; a column-shaped rotor section 360 arranged inside the stator section 321; and a shaft 324 that is fixed coaxially to the center of the rotor section 360 and is rotatably supported.

The stator section 321 is formed with magnetic plate materials laminated in the axial direction, and is provided with teeth 321a that extend towards the radial inside. On these teeth 321a, there is wound, via an insulator (not shown in the drawing), a coil 321b.

Fourth Embodiment

Figure 18:
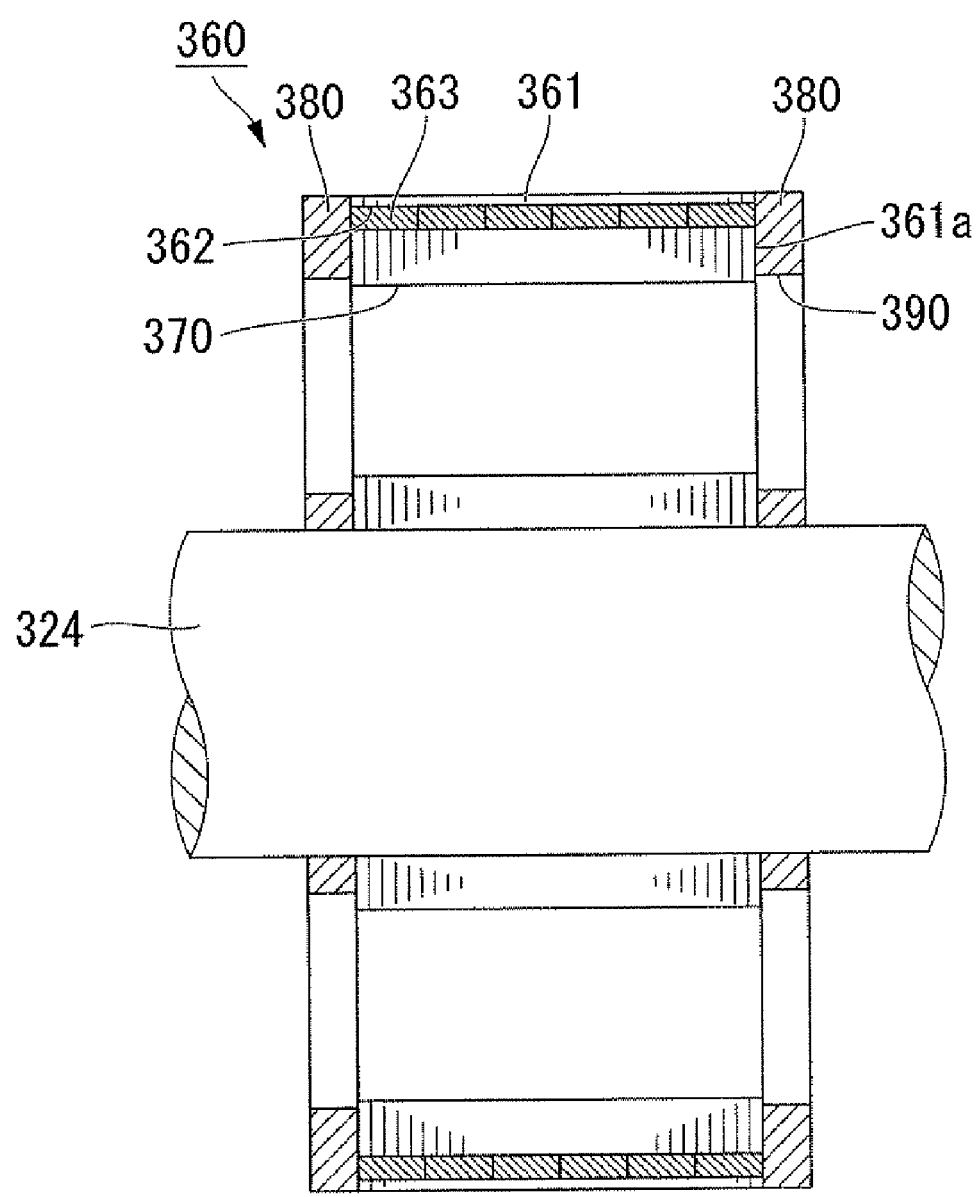
FIG. 18 is an explanatory drawing of a rotor section of a motor according to a fourth embodiment, being a sectional view taken along the line P-P of FIG. 19.
Figure 19:
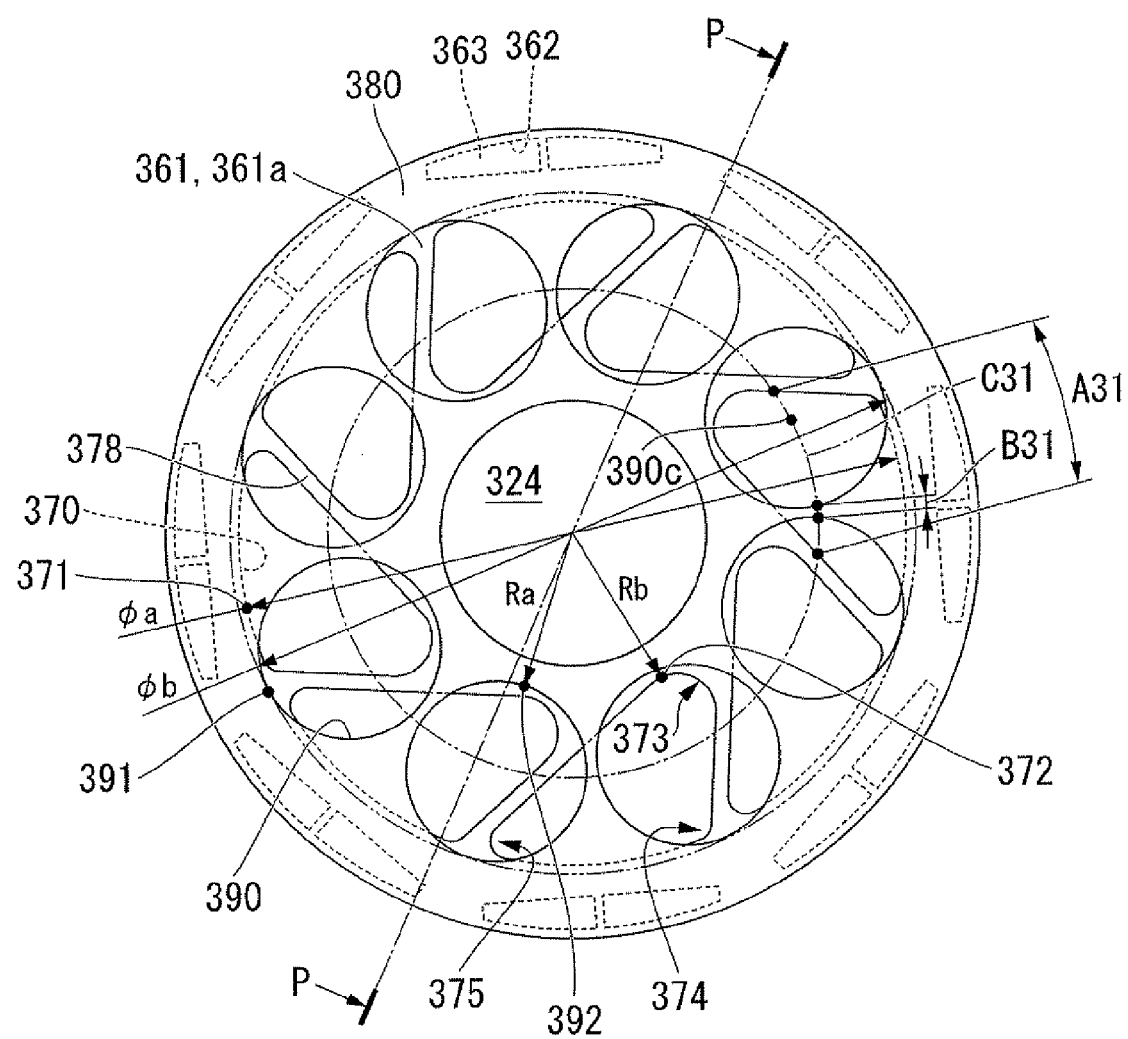
FIG. 19 is a side view of the rotor section of the motor according to the same embodiment.

FIG. 18 and FIG. 19 are explanatory drawings of a rotor section of a motor according to a fourth embodiment. FIG. 18 is a sectional view taken along the line P-P of FIG. 19, and FIG. 19 is a side view. As shown in FIG. 18, the rotor section 360 is provided with a rotor yoke 361 having laminated magnetic plate materials. At the radial center portion of the rotor yoke 361, there is fixed a shaft 324. Around the shaft 324, there are provided a plurality of (for example, eight) first lightening holes 370 passing through the rotor yoke 361 in the axial direction. Specifically, as shown in FIG. 19, there are provided a plurality of ribs 378 bridging between the center portion and the periphery portion of the rotor yoke 361, and between the adjacent ribs 378 there are formed the first lightening holes 370. The ribs 378 extend on one side of the tangential direction with respect to the outer circumference of the shaft 324, and are evenly arranged around the circumferential direction of the rotor yoke 361. Consequently, the first lightening holes 370 are formed in a substantially triangular shape.

Returning to FIG. 18, on the radial outer side of the first lightening holes 370, there are formed a plurality of housing holes 362 passing through the rotor yoke 361 in the axial direction. Inside each of the housing holes 362 there is inserted a permanent magnet 363 made of a rare-earth material such as neodymium. This permanent magnet 363 is magnetized in the radial direction of the rotor yoke 361. Moreover, as shown in FIG. 19, the permanent magnets 363 are arranged around the circumferential direction of the rotor yoke 361, at substantially equal intervals. The permanent magnets 363 adjacent to each other in the circumferential direction are magnetized in mutually opposite directions. As shown in FIG. 18, the permanent magnets 363 are arranged along the axial direction of the rotor yoke 361. Since the plurality of divided permanent magnets 363 are used in this manner, it is possible to reduce eddy current loss that occurs in the permanent magnet 363.

As shown in FIG. 18, the permanent magnets 363 arranged along the axial direction of the rotor yoke 361, repel each other, and there is a possibility that they may exit from the housing holes 362. Consequently, in both of the axial end portions of the rotor yoke 361, there are arranged end surface plates 380. The end surface plates 380 are press-fitted on the shaft 324, and block the opening section of the housing holes 362 on the periphery portion thereof. Thus, the permanent magnets are prevented from falling out from the housing holes 362.

As shown in FIG. 19, around the shaft 324, there are provided a plurality of (for example, eight) second lightening holes 390 passing through the end surface plate 380 in the axial direction. The second lightening holes 390 are of a circular shape for example, and are evenly arranged around the circumferential direction of the end surface plate 380.

(First Lightening Hole, Second Lightening Hole)

The first lightening holes 370 of the rotor yoke 361 and the second lightening holes 390 of the end surface plate 380 are formed so as to satisfy the following relative relationship.

As shown in FIG. 19, on a given circumference, the distance between the adjacent second lightening holes 390 is less than the opening width of the first lightening hole 370. For example, on the circumference C31 passing through the center 390c of the second lightening holes 390, the distance B31 between the adjacent second lightening holes 390 is less than the opening width A31 of the first lightening hole 370. As a result, when seen from the axial direction of the rotor yoke 361, at least a part of all of the first lightening holes 370 is exposed through the second lightening holes 390.

Thereby, even if the cooling oil enters the first lightening hole 370, the cooling oil can be made flow out through the second lightening hole 390. Therefore, circulation of the cooling oil becomes possible, and cooling efficiency of the motor can be improved as a result. Moreover, since the cooling oil does not remain in the first lightening hole 370, it is possible to prevent deterioration of the rotor yoke 361 due to the cooling oil.

Moreover, in the radial direction of the rotor yoke 361, an outermost section 391 of the second lightening hole 390 is arranged on the outer side of an outermost section 371 of the first lightening hole 370. That is to say, the diameter φb of the circumference passing through the outermost section 391 is greater than the diameter φa of the circumference passing through the outermost section 371. Thus, the cooling oil that has entered the first lightening hole 370 below the shaft 324 will not be stopped by the end surface plate 380, and will flow out through the second lightening hole 390.

Moreover, in the radial direction of the rotor yoke 361, an innermost section 392 of the second lightening hole 390 is arranged on the inner side of an innermost section 372 of the first lightening hole 370. That is to say, the distance Ra from the central axis of the shaft 324 to the innermost section 392 is shorter than the distance Rb from the central axis of the shaft 324 to the innermost section 372. Thus, the cooling oil that has entered the first lightening hole 370 above the shaft 324 will not be stopped by the end surface plate 380, and will flow out through the second lightening hole 390.

In particular, in a state where the rotor yoke 361 is rotating, the cooling oil that has entered the first lightening hole 370 receives a centrifugal force, and concentrates at any one of the corner sections of the substantially triangular first lightening hole 370. Consequently, in the present embodiment, there is employed a configuration in which when seen from the axial direction of the rotor yoke 361, all of corner sections 373, 374, and 375 in the substantially triangular first lightening hole 370 are exposed through the second lightening holes 390. Thus, the cooling oil that has concentrated at any one of the corner sections of the first lightening holes 370 will not be stopped by the end surface plate 380, and will flow out through the second lightening holes 390. Therefore, it becomes possible to reduce mechanical deterioration. Moreover it becomes possible to improve the efficiency of the motor. Furthermore, since the cooling oil does not remain in the first lightening holes 370, it is therefore possible to prevent deterioration of the rotor yoke 361 due to the cooling oil.

As described in detail above, in the motor according to the present embodiment, when seen from the axial direction of the rotor yoke 361, at least a part of all of the first lightening holes 370 is exposed through the second lightening holes 390. Thus, the cooling oil that has entered the first lightening hole 370 will not be stopped by the end surface plate 380, and will flow out through the second lightening hole 390. Therefore, circulation of the cooling oil becomes possible, and cooling efficiency of the motor can be improved as a result. Moreover, since the cooling oil does not remain in the first lightening holes 370, it is possible to prevent deterioration of the rotor yoke 361 due to the cooling oil.

Fifth Embodiment

Figure 20:
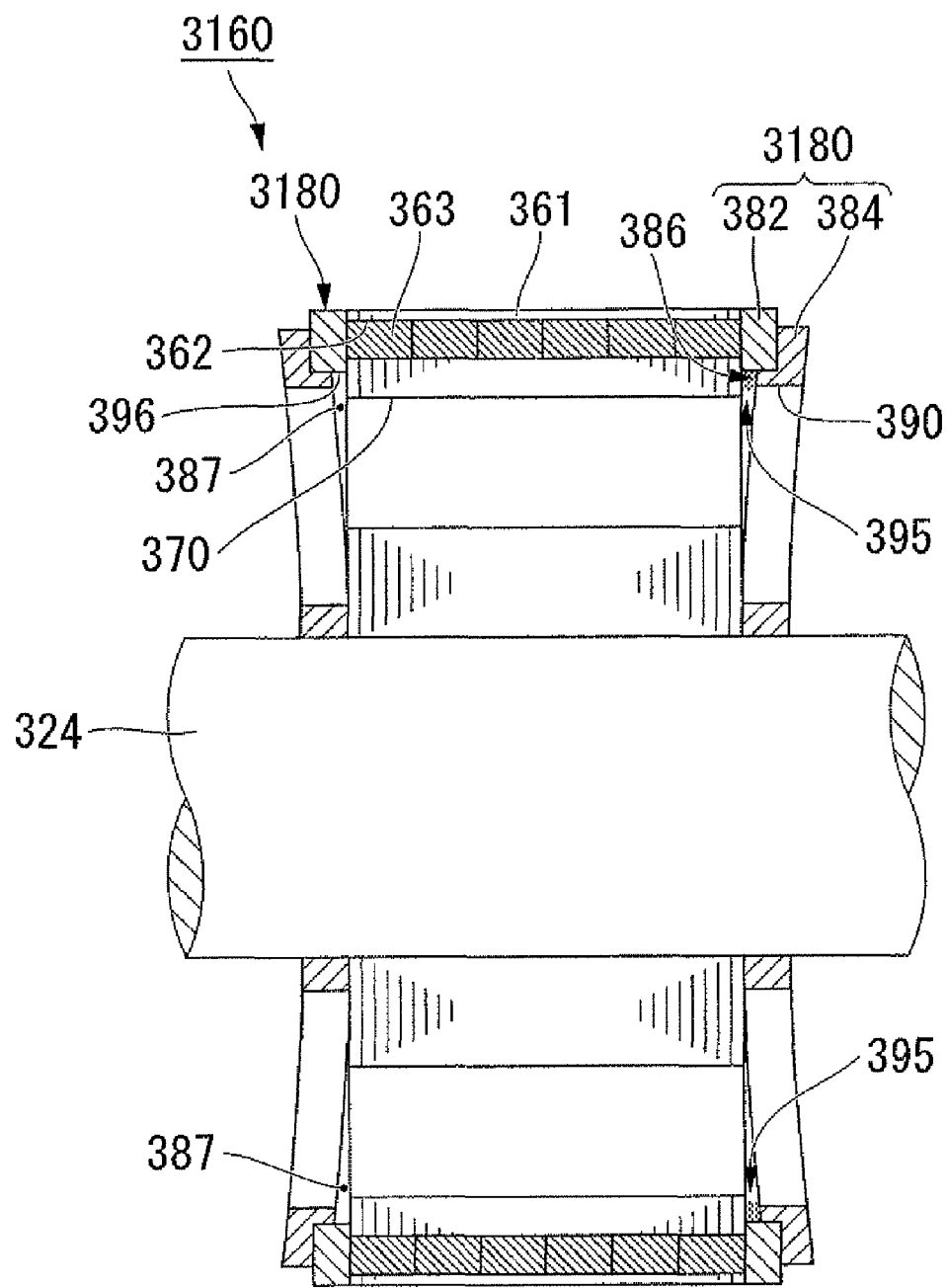
FIG. 20 is an explanatory drawing of a rotor section of a motor according to a fifth embodiment, being a sectional view taken along the line Q-Q of FIG. 21.
Figure 21:
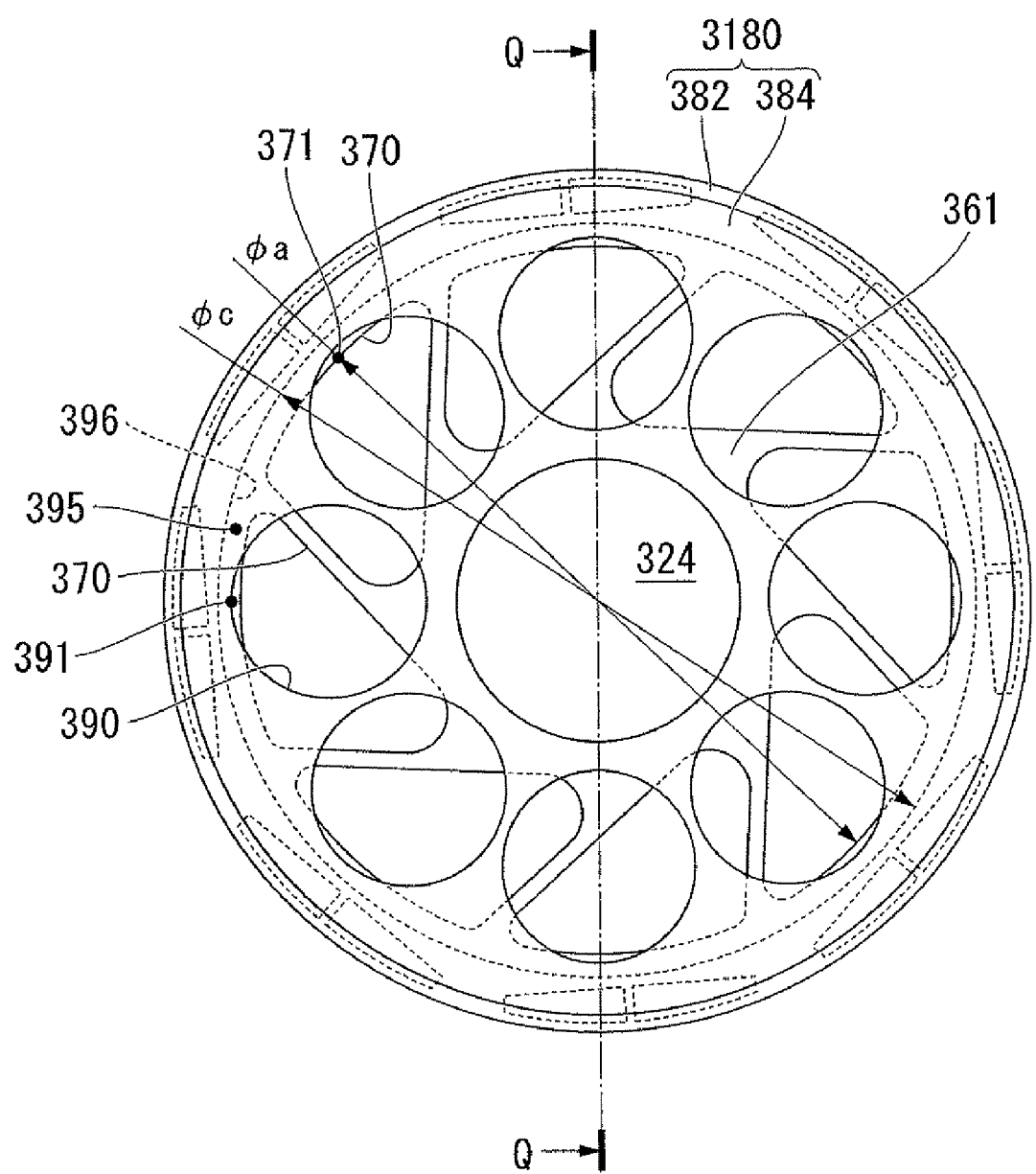
FIG. 21 is a side view of the rotor section of the motor according to the same embodiment.

FIG. 20 and FIG. 21 are explanatory drawings of a rotor section 3160 of a motor according to a fifth embodiment. FIG. 20 is a sectional view taken along the line Q-Q of FIG. 21, and FIG. 21 is a side view. As shown in FIG. 20, the fifth embodiment differs from the fourth embodiment in that between the rotor yoke 361 and an end surface plate 3180 there is formed a clearance 387. Detailed descriptions are omitted for parts with structures the same as those in the fourth embodiment.

In the fourth embodiment shown in FIG. 18, if the end surface plate 380 is formed with a magnetic material (for example, iron), then a magnetic flux produced in the permanent magnet 363 is shortcircuited via the end surface plate 380. Consequently, formation of the end surface plate 380 with a non-magnetic material (for example, stainless steel) may be considered. However, if the coefficient of linear expansions of the end surface plate 380 and the shaft 324 (for example, made of iron) are different, then heat development associated with operation of the motor will cause the fixation of the end surface plate 380 on the shaft 324 to become loose. If this end surface plate 380 moves in the axial direction, then there will be a possibility of the permanent magnets 363 falling out from the housing holes 362.

Moreover, if the end surface plate 380 rotates in the circumferential direction, then there will be a possibility that rotation balance of the motor is upset.

With consideration to the above circumstances, as shown in FIG. 20, the end surface plate 3180 according to the fifth embodiment is configured with a ring-shaped plate 382 and a supporting plate 384. The ring-shaped plate 382 is formed so as to block the opening section of the housing holes 362 of the permanent magnets 363. This ring-shaped plate 382 is formed with a non-magnetic material (for example, stainless steel), and is therefore capable of suppressing magnetic flux short-circuiting via the end surface plate 3180. Moreover, the disc-shaped supporting plate 384 is provided so as to clamp the ring-shaped plate 382 between itself and the rotor yoke 361. This supporting plate 384 (for example, made of iron) has a coefficient of linear expansion the same as that of the shaft 324. Therefore, even if heat is developed in the motor due to the operation, the fixation of the end surface plate 3180 on the shaft 324 will not be loosened.

In the center portion of the supporting plate 384 there is formed a circular projecting section 386 that projects toward the rotor yoke 361. The outer periphery of this projecting section 386 is fitted on the inner periphery of the ring-shaped plate 382, and the ring-shaped plate 382 is thereby supported in the radial direction. The height of the projecting section 386 is shorter than the thickness of the ring-shaped plate 382. Consequently, between the rotor yoke 361 and the supporting plate 384 there is formed a clearance 387. The supporting plate 384 is press-fitted and fixed on the shaft 324 in a state where the center portion of the supporting plate 384 is flexurally deformed toward the rotor yoke 361, so as to take up this clearance 387. The ring-shaped plate 382 is pressed toward the rotor yoke 361 by the restoring force of the flexurally deformed supporting plate 384, and it is therefore possible to reliably prevent the permanent magnets 363 from falling out from of the housing hole 362.

The center portion of the supporting plate 384 is in close proximity to the rotor yoke 361, however, the periphery portion of the supporting plate 384 is arranged distanced from the rotor yoke 361 with the ring-shaped plate 382 sandwiched therebetween. Consequently, on the periphery portion between the rotor yoke 361 and the supporting plate 384, there is formed a groove section 395 with the inner circumferential surface of the ring-shaped plate 382 serving as a bottom surface thereof. This groove section 395 opens toward the central axis of the rotor yoke 361, and is formed around the entire periphery of the rotor yoke 361.

As shown in FIG. 21, the bottom surface 396 of the groove section 395 (that is, the inner circumferential surface of the ring-shaped plate 382) is arranged on the radial outer side of the outermost section 371 of the first lightening holes 370 of the rotor yoke 361.

That is to say, the diameter φc of the bottom surface 396 of the groove section 395 is greater than the diameter φa of the circumference passing through the outermost section 371. Thus, the cooling oil that has entered the first lightening hole 370 flows out into the groove section 395 with centrifugal force when the rotor yoke rotates. Moreover, as with the fourth embodiment, the radial outermost section 391 of the second lightening hole 390 is arranged on the outer side of the outermost section 371 of the first lightening hole 370. Therefore, the cooling oil overflowing from the groove section 395 flows out to the outside through the second lightening hole 390.

If rotation of the rotor yoke 361 stops, then the cooling oil remaining on the entire circumference of the groove section 395 falls through the clearance 387 shown in FIG. 20. This cooling oil flows out to the outside though the second lightening holes 390 below the shaft 324. Thus, circulation of the cooling oil becomes possible, and cooling efficiency of the motor can be improved as a result. Moreover, since the cooling oil does not remain in the first lightening holes 370 and in the groove section 395, it is possible to prevent deterioration of the rotor yoke 361 due to the cooling oil.

Incidentally, in the fourth embodiment shown in FIG. 19, in order to expose all of the corner sections 373, 374, and 375 of the first lightening hole 370 through the second lightening holes 390, it was necessary to position the rotor yoke 361 and the end surface plate 380 at predetermined relative positions (phase) in the circumferential direction, and to press-fit the shaft 324. On the other hand, as shown in FIG. 21, in the fifth embodiment, the groove section into which the cooling oil flows out is formed around the entire periphery, and therefore it is not necessary to position the rotor yoke 361 and the end surface plate 380 in the circumferential direction. Therefore, the motor manufacturing process can be simplified.

Sixth Embodiment

Figure 22:
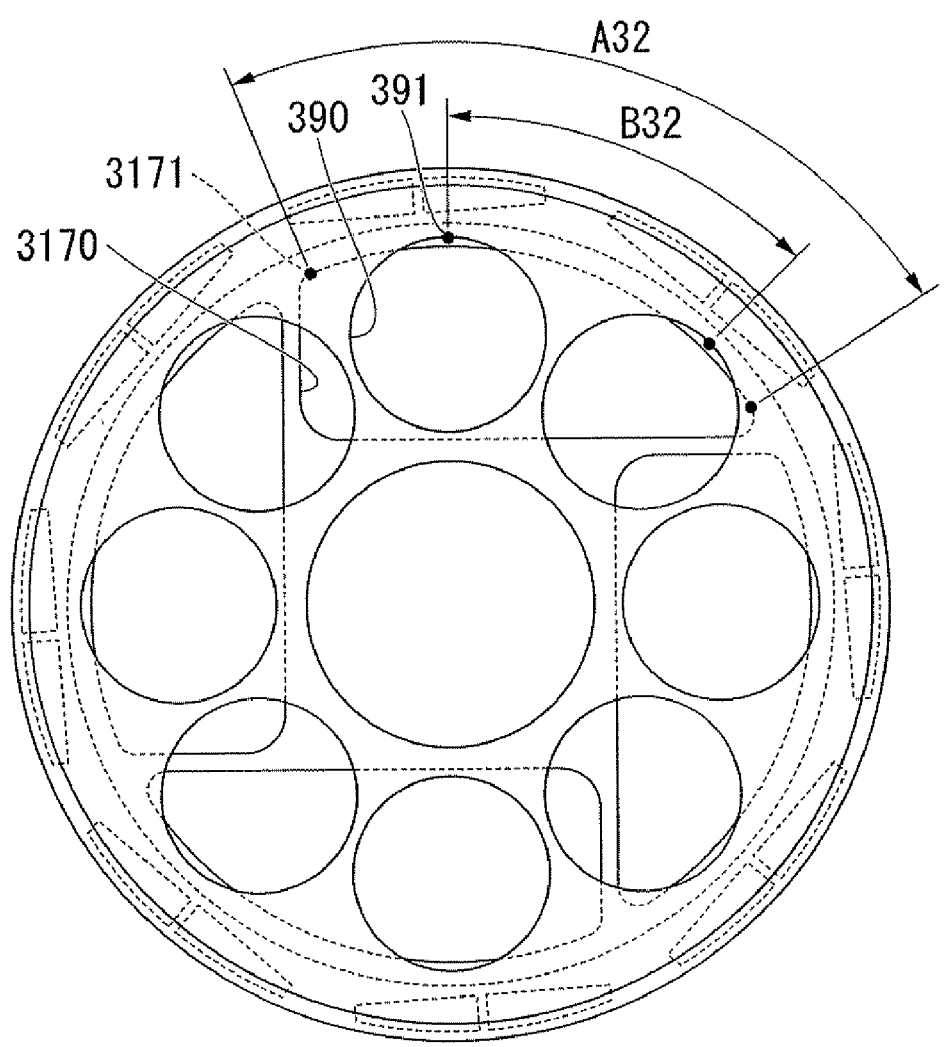
FIG. 22 is a side view of a rotor section of a motor according to a sixth embodiment.

FIG. 22 is a side view of a rotor section of a motor according to a sixth embodiment. In the sixth embodiment, there is formed first lightening holes 3170 with an opening area larger than that in the above embodiments. For example, among the plurality of (for example, eight) first lightening holes in the fifth embodiment, pairs of adjacent first lightening holes are connected, and thereby a plurality of (for example, four) first lightening holes 3170 are formed.

Thus, the circumferential direction distance B32 between the outermost sections 391 of the adjacent second lightening holes 390 is shorter than the circumferential direction length A32 of an outermost section 3171 of the first lightening hole 3170. In this case, when seen from the axial direction of the rotor yoke 361, at least a part of the circumferential direction length of the outermost section 3171 of the first lightening hole 3171 is always exposed through the second lightening holes 390. Thus, even if the cooling oil that has entered the first lightening hole 3170 concentrates in the outermost section 3171 due to the centrifugal force in rotation of the rotor yoke 361, it will flow out through the second lightening holes 390. Therefore, circulation of the cooling oil becomes possible, and cooling efficiency of the motor can be improved as a result. Moreover, since the cooling oil does not remain in the first lightening holes 3170, it is possible to prevent deterioration of the rotor yoke 361 due to the cooling oil.

Seventh Embodiment

Figure 23:
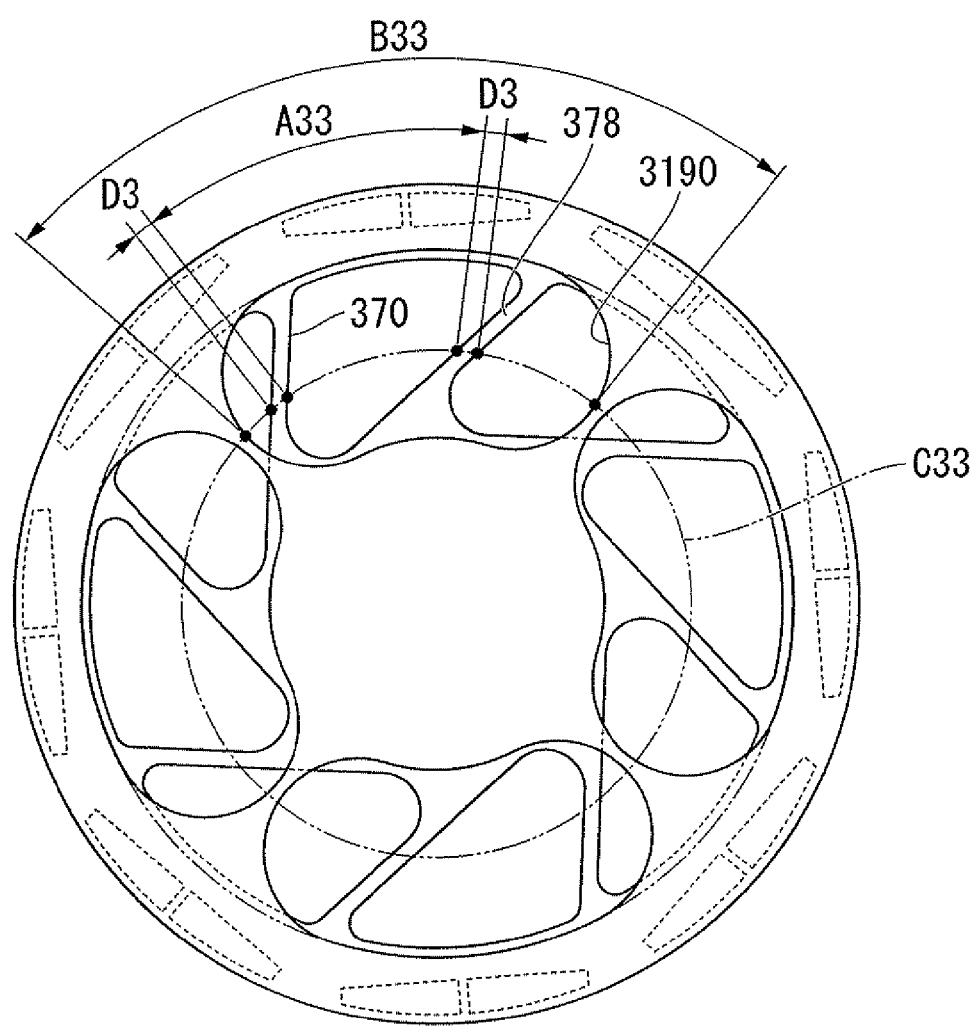
FIG. 23 is a side view of a rotor section of a motor according to a seventh embodiment.

FIG. 23 is a side view of a rotor section of a motor according to a seventh embodiment. In the seventh embodiment, there is formed second lightening holes 3190 with an opening area larger than that in the above embodiments. For example, among the plurality of (for example, eight) second lightening holes in the fourth embodiment, pairs of adjacent second lightening holes are connected, and thereby a plurality of (for example, four) second lightening holes 3190 are formed.

In this embodiment, on a given circumference C33, it is preferable that the opening width B33 of the second lightening hole 3190 be greater than the total width of the width A33 of the first lightening hole 370 and the width D3 of the ribs 378 on both sides thereof (A33+2×D3). In this case, the plurality of first lightening holes 370 are exposed through the second lightening holes 3190. Thus, the cooling oil that has entered the first lightening holes 370 can easily flow out through the second lightening holes 3190. Therefore, circulation of the cooling oil becomes possible, and cooling efficiency of the motor can be improved as a result. Moreover, since the cooling oil does not remain in the first lightening holes 370, it is possible to prevent deterioration of the rotor yoke 361 due to the cooling oil.

The technical scope of the present invention is not limited to the above embodiments, and includes ones with various types of modifications added to the above embodiments without departing from the scope of the present invention. That is to say, the specific structures and shapes that have been illustrated in the embodiments are merely examples, and appropriate modifications may be made thereto.

For example, in the embodiments, the first lightening hole is of a substantially triangular shape, and the second lightening hole is of a circular shape. However, the first lightening hole and the second lightening hole may be of other shapes.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A motor comprising: a rotatably supported shaft; and a rotor section press-fitted and fixed coaxially to said shaft, wherein
    said rotor section is provided with:
    a rotor yoke;
    a housing hole that is formed on an end surface of said rotor yoke along the axial direction of the shaft;
    a permanent magnet housed within said housing hole; and
    a pair of end surface plates: that have a ring-shaped plate that is provided so as to cover at least an opening section of said housing hole and that is made of a non-magnetic material, and a supporting plate that supports said ring-shaped plate, that is press-fitted and fixed on said shaft, and that has a coefficient of linear expansion equivalent to that of said shaft; that are provided on axial end portions of said rotor yoke; and that clamp said rotor yoke so as to hold said permanent magnet within said housing hole.

2. The motor according to claim 1, wherein:
    said ring-shaped plate is clamped between a periphery portion of a first end surface of said supporting plate and said rotor yoke;
    said supporting plate is provided with a protruding section that projects from said first end surface toward said rotor yoke; and
    said protruding section is inserted into a center hole of said ring-shaped plate.

3. The motor according to claim 2, wherein:
    a height of said protruding section is lower than a thickness of said ring-shaped plate; and
    said supporting plate, in a state where a radial center portion thereof is flexurally deformed toward said rotor yoke, is press-fitted and fixed on said shaft, so as to press said ring-shaped plate toward said rotor yoke in a periphery portion of said first end surface.

4. The motor according to claim 3, wherein said supporting plate includes a lightening section formed along the thickness direction of said supporting plate.

5. The motor according to claim 3, wherein said supporting plate includes a thin wall section formed along the thickness direction of said supporting plate.

6. The motor according to claim 2, wherein said protruding section is press-fitted into said center hole of said ring-shaped plate.

7. The motor according to claim 1, wherein:
said shaft is provided with: a small-diameter section on which a first end surface plate among said pair of end surface plates is press-fitted; a medium-diameter section that has said rotor yoke press-fitted thereon and that has a diameter greater than that of said small-diameter section; and a first intermediate section that is arranged between said small-diameter section and said medium-diameter section, with a diameter that varies along the axial direction; and
said first end surface plate is provided with a housing section capable of housing said first intermediate section, on an edge portion on said rotor yoke side in a press-fitting hole for said shaft.

8. The motor according to claim 7, wherein:
said pair of end surface plates are further provided with a center hole in a radial center portion thereof; and
said supporting plate, in a state where a radial center portion thereof is flexurally deformed toward the inside of said center hole, is press-fitted and fixed on said shaft, so as to press said ring-shaped plate toward said rotor yoke in a periphery portion of a first end surface of said supporting plate.

9. The motor according to claim 7, wherein:
said shaft is further provided with: a large-diameter section that is formed on an axial opposite side to said small-diameter section with said medium-diameter section therebetween, with a diameter greater than that of said medium-diameter section, and that has a second end surface plate among said pair of end surface plates, press-fitted thereon; and a second intermediate section with a diameter that changes along the axial direction, between said medium-diameter section and said large-diameter section;
an end surface on a rotor yoke side of said first end surface plate is arranged on a rotor yoke side of a border between said first intermediate section and said medium-diameter section; and
an end surface on a rotor yoke side of said second end surface plate is arranged on a rotor yoke side of a border between said second intermediate section and said medium-diameter section.

10. The motor according to claim 7, wherein said housing section is provided with: a diameter expanded section in which said press-fitting hole is expanded; and a chamfered section in which said end edge portion is chamfered.

11. The motor according to claim 1, wherein:
said rotor section is further provided with a plurality of first lightening holes formed along an axial direction from an end surface of said rotor yoke, so as to be arranged on a radial inner side of said housing hole;
said pair of end surface plates are further provided with a plurality of second lightening holes; and
when seen from said axial direction, at least a part of each of said first lightening holes is exposed through said second lightening holes.

12. The motor according to claim 11, wherein a diameter of a circumference passing through an outermost section in said radial direction of said second lightening hole, is greater than a diameter of a circumference passing through an outermost section in said radial direction of said first lightening hole.

13. The motor according to claim 11, wherein a distance from a central axis of said shaft to an innermost section in said radial direction of said second lightening hole, is shorter than a distance from said central axis to an innermost section in said radial direction of said first lightening hole.

14. The motor according to claim 11, wherein:
said first lightening hole is formed in a polygonal shape; and
when seen from said axial direction, all of the corner sections of said first lightening hole are exposed through said second lightening holes.

15. The motor according to claim 11, wherein:
said end surface plate includes a protruding section that blocks an opening section of said housing hole, the protruding section being formed on a periphery portion of an end surface on a rotor yoke side of said end surface plate; and
a diameter of a circumference passing through an innermost section in said radial direction of said protruding section, is greater than a diameter of a circumference passing through an outermost section in said radial direction of said first lightening hole.

16. The motor according to claim 15, wherein said protruding section is configured by said ring-shaped plate.

17. The motor according to claim 16, wherein said supporting plate, in a state where a center portion thereof is flexurally deformed toward said rotor yoke, is press-fitted and fixed on said shaft.

* * * * *